United States Patent
Dukoff

(10) Patent No.: US 12,037,071 B2
(45) Date of Patent: Jul. 16, 2024

(54) COLLAPSIBLE SCOOTER

(71) Applicant: RAFA Design & Innovations Inc., Toronto (CA)

(72) Inventor: Clayton Alexander Dukoff, Toronto (CA)

(73) Assignee: RAFA DESIGN & INNOVATIONS INC., Toronto (CA)

(*) Notice: Subject to any disclaimer, the term of this patent is extended or adjusted under 35 U.S.C. 154(b) by 305 days.

(21) Appl. No.: 17/247,921

(22) Filed: Dec. 30, 2020

(65) Prior Publication Data

US 2021/0206448 A1    Jul. 8, 2021

Related U.S. Application Data

(60) Provisional application No. 62/957,026, filed on Jan. 3, 2020.

(51) Int. Cl.
*B62K 15/00* (2006.01)
*B62K 3/00* (2006.01)

(52) U.S. Cl.
CPC ............ *B62K 15/008* (2013.01); *B62K 3/002* (2013.01)

(58) Field of Classification Search
CPC ..... B62K 15/008; B62K 3/002; A63C 17/011; A63C 17/062; A63C 17/06
See application file for complete search history.

(56) References Cited

U.S. PATENT DOCUMENTS

| 5,671,553 A | * | 9/1997 | Burkhart | ................. E01C 19/15 |
| | | | | 37/285 |
| 8,801,009 B2 | | 8/2014 | Sapir | |
| 2012/0018968 A1 | * | 1/2012 | Joslin | .................... B62K 3/002 |
| | | | | 280/87.041 |
| 2014/0000888 A1 | | 1/2014 | Liao | |

FOREIGN PATENT DOCUMENTS

| CN | 104024098 A | * | 11/2011 | ........... B62K 15/008 |
| CN | 104024098 A | * | 11/2011 | |
| CN | 202728465 U | | 2/2013 | |
| CN | 106882312 A | * | 6/2017 | |
| CN | 106882312 A | | 6/2017 | |
| EP | 3145800 B1 | | 3/2017 | |
| WO | 2009/141629 A1 | | 11/2009 | |

OTHER PUBLICATIONS

Extended European Search Report relating to European Application No. 20217891.9, dated May 12, 2021.

* cited by examiner

*Primary Examiner* — James A Shriver, II
*Assistant Examiner* — Nicholas R. Kandas
(74) *Attorney, Agent, or Firm* — Norton Rose Fulbright Canada LLP

(57) ABSTRACT

In an aspect, a collapsible scooter is provided and includes a footboard, a front bridge, a head tube, a steering member with a front wheel, and a second wheel. The front bridge is hingedly connected to the footboard for movement between a use position in which a front bridge end is positioned forward of the front end of the footboard, and a front bridge stowage position in which the first front bridge end is positioned rearward of the front end of the footboard. The head tube is hingedly connected to the front bridge for movement between a use position and a stowage position, in which the head tube is positioned rearward of the front end (Continued)

of the footboard. The steering member passes through the head tube and is pivotable therein about the steering axis.

12 Claims, 19 Drawing Sheets

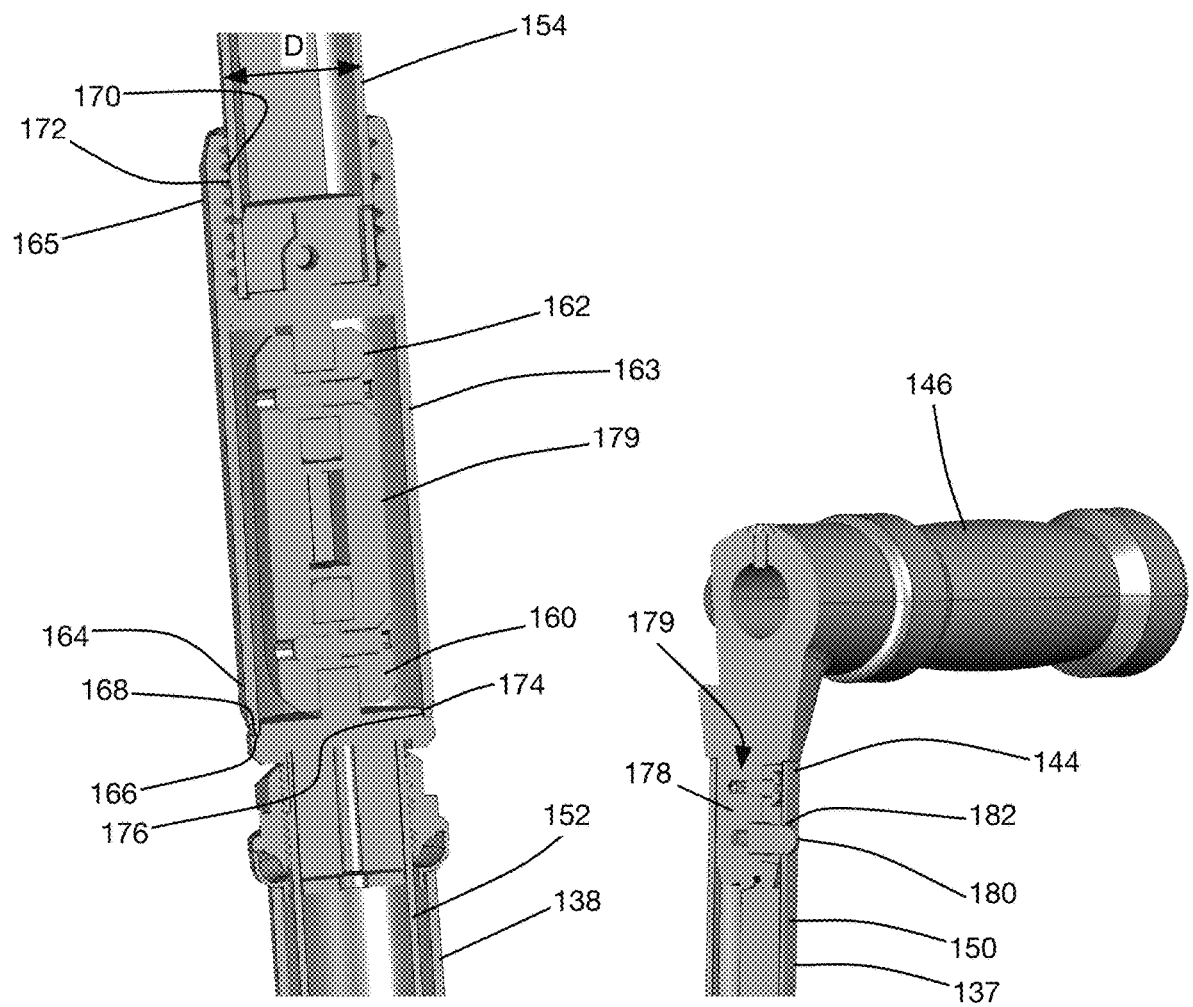
FIG. 21　　　　FIG. 22

COLLAPSIBLE SCOOTER

CROSS-REFERENCE TO RELATED APPLICATIONS

This application claims the benefit of priority to U.S. Provisional Patent Application No. 62/957,026 filed Jan. 3, 2020, the contents of which are incorporated herein in their entirety.

FIELD

The specification relates generally to foot-deck based vehicles and more particularly to scooters that are collapsible.

BACKGROUND OF THE DISCLOSURE

It is known to construct user-propelled scooters (also referred to as kick scooters) to be foldable in order to reduce their occupied volume, either for storage or for transport. However, typical foldable scooters do not fold very compactly and thus remain inconveniently bulky even in their folded form, thereby hampering their portability. Furthermore, some scooters that are foldable are difficult to fold and unfold, or can take a long period of time to fold and unfold.

It would be beneficial to provide a scooter that addresses one or more of the above-noted problems, or other problems with foldable scooters.

SUMMARY OF THE DISCLOSURE

In one aspect, the disclosure describes a collapsible scooter. The collapsible scooter includes a footboard, a head tube, a telescoping shaft, a first wheel and a second wheel. The footboard has a first end and a second end, and defines a channel. The head tube is hingedly coupled to the footboard. The telescoping shaft has a first end and a second end, and has a locking hinge coupled to the first end of the telescoping shaft. The second end of the telescoping shaft is hingedly coupled to a connection member that extends from, and is rotatable within, the head tube. A handle is slidably coupled to the locking hinge. The first wheel is rotatably coupled to the connection member. A second wheel is rotatably coupled to the footboard. In a first mode: the first wheel, second wheel, and head tube are configured to rotate to a first position wherein the first wheel, second wheel, and head tube are each received within the channel, and the handle and telescoping shaft are each configured to rotate to a second position wherein the handle and the telescoping shaft are each adjacent to, and extend along a longitudinal length of, the footboard. In a second mode: the first wheel, second wheel, and head tube are configured to rotate to a third position wherein the first wheel and second wheel extend away from the footboard, and the handle and telescoping shaft are each configured to rotate to a fourth position wherein the handle and telescoping shaft extend away from the footboard. The telescoping shaft and the connection member are included in a steering member, which has a first end that has the first wheel mounted rotatably thereto, and a second end, which is the end of the telescoping shaft which has the locking hinge thereon.

In another aspect, a collapsible scooter is provided and includes a footboard, a front bridge, a head tube, a steering member with a front wheel thereon, and a second wheel. The footboard has a front end, a rear end, a top surface, and a bottom region. The footboard defines a longitudinal axis for the collapsible scooter. The front bridge has a first front bridge end and a second front bridge end. The front bridge is hingedly connected at the second front bridge end to the footboard for movement between a front bridge use position in which the first front bridge end is positioned forward of the front end of the footboard, and a front bridge stowage position in which the first front bridge end is positioned rearward of the front end of the footboard. The head tube defines a steering axis. The head tube is hingedly connected to the front bridge for movement between a head tube use position and a head tube stowage position. When the front bridge is in the front bridge use position and the head tube is in the head tube use position, the head tube is positioned forward of the footboard and is oriented such that the steering axis is approximately perpendicular to the top surface of the footboard. In the head tube stowage position, the head tube is positioned rearward of the front end of the footboard. The steering member passes through the head tube and is pivotable therein about the steering axis. The steering member has a first steering member end and a second steering member end. The first steering member end has a first wheel rotatably connected thereto, and the second steering member end has a handle for gripping by a user. The second wheel is coupled to the footboard. In a use mode for the collapsible scooter, the front bridge is positioned in the front bridge use position and the head tube is positioned in the head tube use position, and the first and second wheels are positioned to support the footboard above a ground surface. In a stowage mode for the collapsible scooter, the front bridge is positioned in the front bridge stowage position and the head tube is positioned in the head tube stowage position.

In some embodiments, the steering member hinge includes a hinge link that has a first hinge link end that is pivotally connected to the first hinged portion of the steering member, and a second hinge link end that is pivotally connected to the second hinged portion of the steering member. In some further embodiments, the steering member further includes a hinge sleeve that is movable between a locking position in which the hinge sleeve extends over some of the first hinged portion of the steering member and over some of the second hinged portion of the steering member so as to hold the first and second hinged portions of the steering member in alignment with the steering axis, and an unlocking position in which the hinge sleeve extends along only one of the first and second hinged portions of the steering member, so as to permit movement of the second hinged portion of the steering member between the hinged portion use position and the hinged portion stowage position.

In yet another aspect, a collapsible scooter is provided and includes a footboard, a head tube, a steering member with a front wheel thereon, and a second wheel. The footboard has a front end, a rear end, a top surface, and a bottom region. The footboard defines a longitudinal axis for the collapsible scooter. The head tube defines a steering axis and is connected at least indirectly to the footboard. The steering member passes through the head tube and is pivotable therein about the steering axis. The steering member has a first steering member end and a second steering member end. The first steering member end has a first wheel rotatably connected thereto, and the second steering member end has a handle for gripping by a user. The steering member includes a first hinged portion and a second hinged portion. The first hinged portion passes through the head tube, and the second hinged portion is hingedly connected to the first hinged portion by a steering member hinge for movement between a hinged portion use position in which the second hinged portion is aligned with the first hinged portion along the steering axis and a hinged portion stowage position in which the second hinged portion is folded to be adjacent to the first hinged portion. The second wheel is rotatably coupled to the footboard. In a use mode for the collapsible scooter, the front bridge is positioned in the front bridge use position and the head tube is positioned in the head tube use position, and the first and second wheels are positioned to support the footboard above a ground surface. In a stowage mode for the collapsible scooter, the second hinged portion is in the hinged portion stowage position. Optionally, the steering member hinge includes a hinge link that has a first hinge link end that is pivotally connected to the first hinged portion of the steering member, and a second hinge link end that is pivotally connected to the second hinged portion of the steering member.

In some embodiments, the second hinged portion includes a first telescopic portion and a second telescopic portion, wherein the first and second portion is telescopically connected to the first portion.

In some embodiments, the steering member further includes a hinge sleeve that is movable between a locking position in which the hinge sleeve extends over some of the first hinged portion of the steering member and over some of the second hinged portion of the steering member so as to hold the first and second hinged portions of the steering member in alignment with the steering axis, and an unlocking position in which the hinge sleeve extends along only one of the first and second hinged portions of the steering member, so as to permit movement of the second hinged portion of the steering member between the hinged portion use position and the hinged portion stowage position. In some further embodiments, the hinge sleeve has a first hinge sleeve end and a second hinge sleeve end, and has a hinge sleeve abutment shoulder at one of the first and second hinge sleeve ends that is positioned to abut a steering member abutment shoulder on one of the first and second hinged portions of the steering member, and has a hinge sleeve threaded region at the other of the first and second hinge sleeve ends, that is positioned to engage a steering member threaded region on the other of the first and second hinged portions of the steering member so as to drive the hinge sleeve abutment shoulder to abut the steering member abutment shoulder with sufficient force to place the hinge link in tension between the first and second hinged portions of the steering member so as to take up any play present between the hinge link and the first hinged portion and between the hinge link and the second hinged portion.

In any of the aspects described above, the handle may optionally be removable from the second end of the steering member.

Embodiments may include any suitable combinations of the above-described features.

Other technical advantages may become readily apparent to one of ordinary skill in the art after review of the following figures and description.

BRIEF DESCRIPTIONS OF THE DRAWINGS

For a better understanding of the embodiment(s) described herein and to show more clearly how the embodiment(s) may be carried into effect, reference will now be made, by way of example only, to the accompanying drawings.

Figure 11:
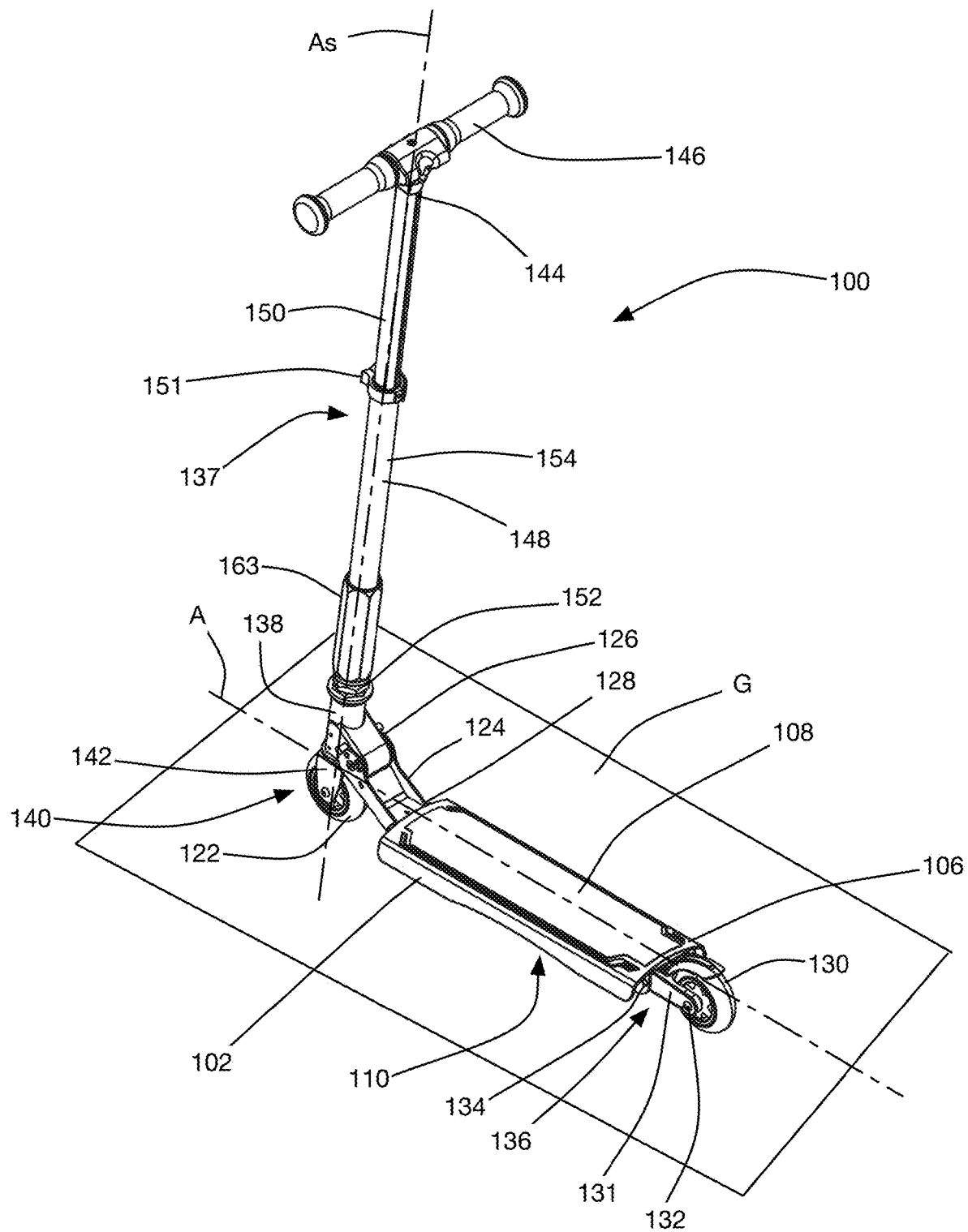
FIG. 11 is a perspective view of another collapsible scooter in accordance with another embodiment of the present disclosure, in a use mode.

FIGS. 12, 13, 14, 15, 16, 17, and 18 are perspective views showing the collapsible scooter shown in FIG. 11, illustrating the transition between a use mode for the collapsible scooter and a stowage mode for the collapsible scooter.

Figure 19:
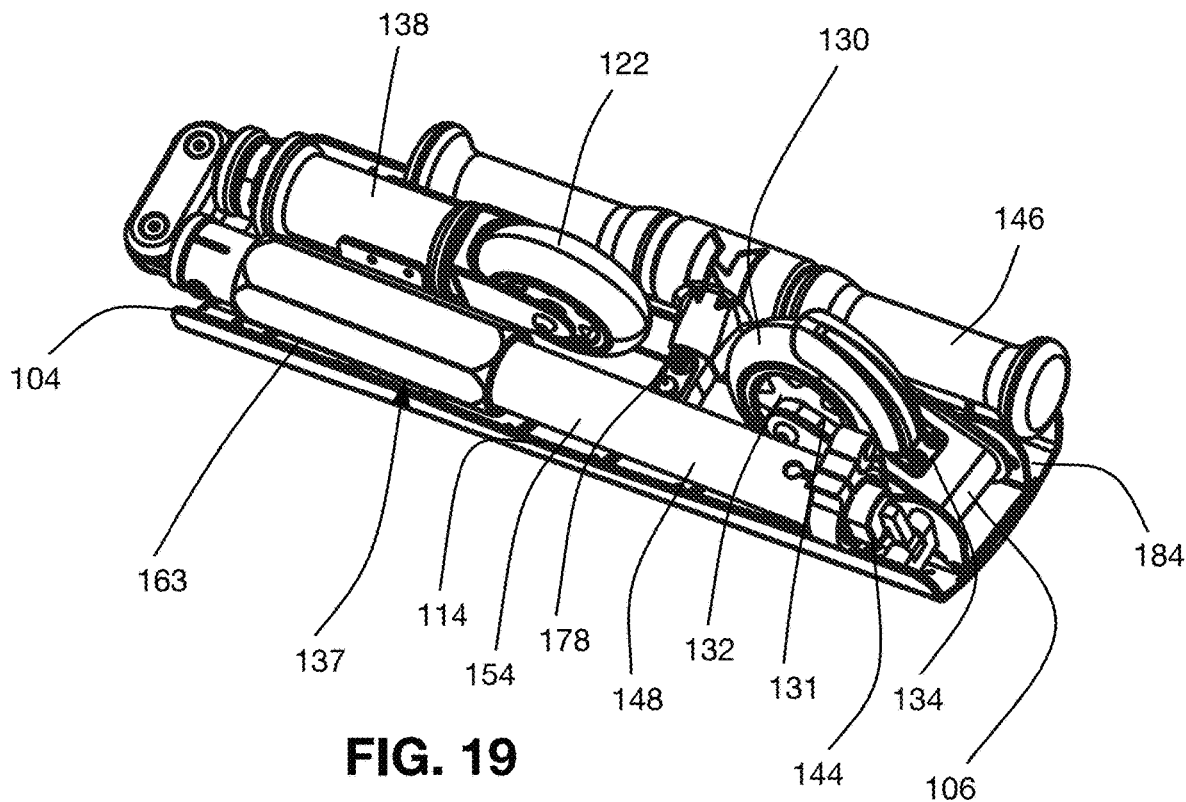

FIG. 19 is a perspective view of the collapsible scooter shown in FIG. 11 in the stowage mode.

Figure 20:
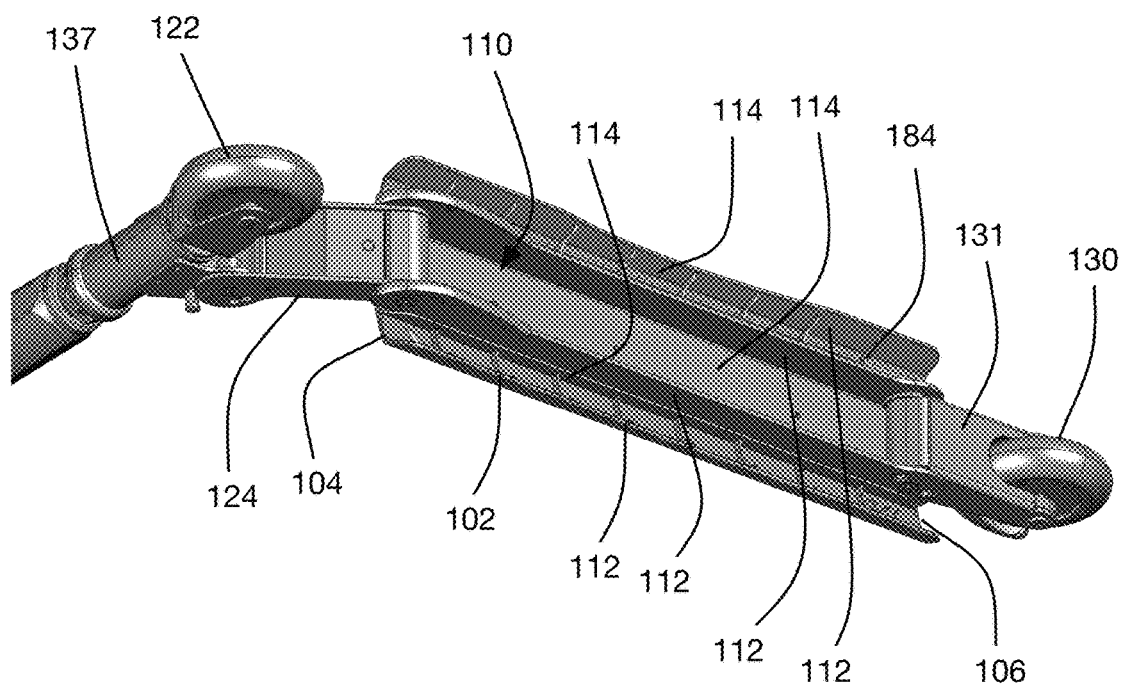

FIG. 20 is a perspective view of a footboard from the collapsible scooter shown in FIG. 11, to show channels contained thereon.

FIG. 21 is a sectional side view of a portion of a steering member that makes up part of the collapsible scooter shown in FIG. 11.

FIG. 22 is a perspective sectional view of a handle from the collapsible scooter shown in FIG. 11.

Figure 23:
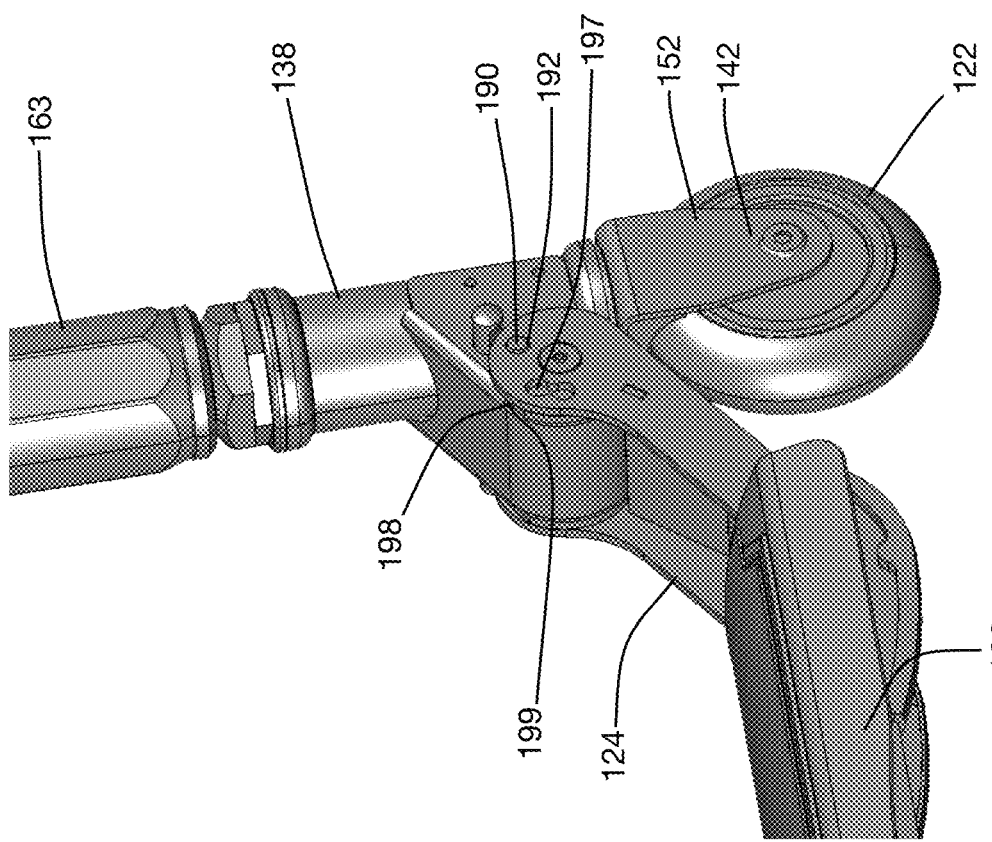

FIG. 23 is a perspective view of a front bridge and head tube from the collapsible scooter shown in FIG. 11.

Figure 24:
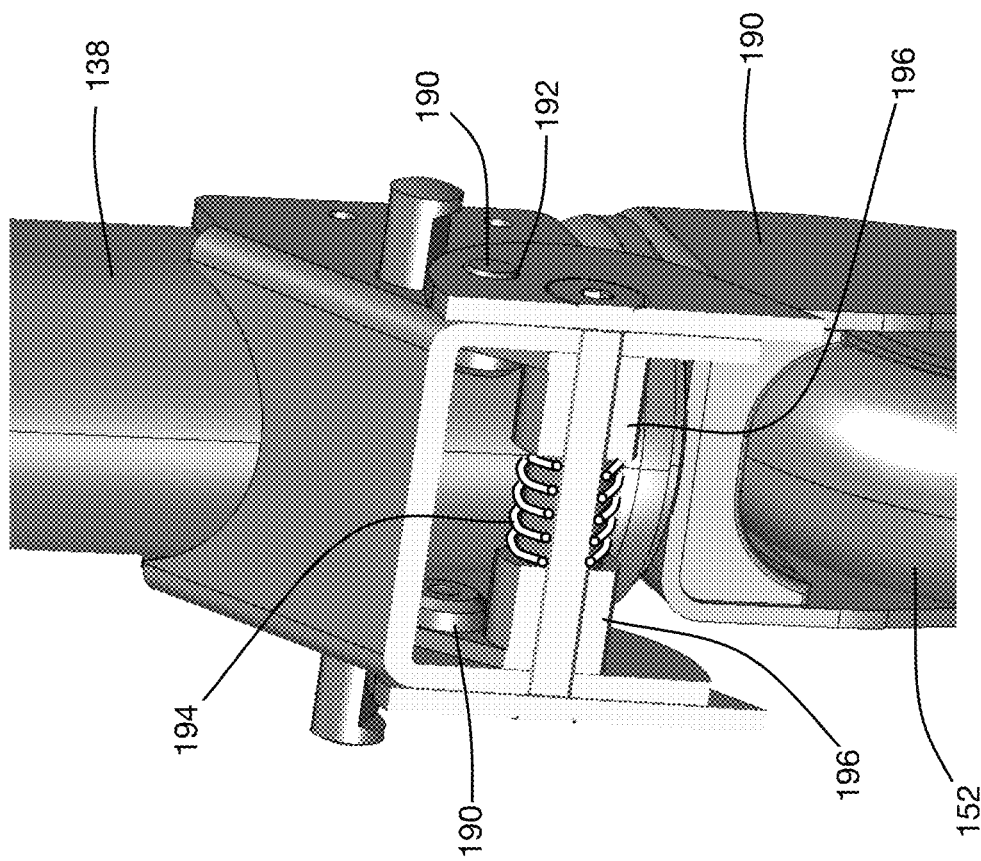

FIG. 24 is a magnified perspective sectional view of the front bridge and the head tube shown in FIG. 23.

Unless otherwise specifically noted, articles depicted in the drawings are not necessarily drawn to scale.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

The terms "coupled to" and "connected to" may be used interchangeably. Moreover, these terms are not intended to indicate a direct coupling or direct connection unless it is explicitly stated that it is a direct coupling or direct connection.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

The following description discloses scooters that may be collapsed into a compact volume without tools. One collapsible scooter disclosed herein comprises a footboard defining a channel. A head tube may be hingedly coupled to each of the footboard and a telescoping shaft. The telescoping shaft may have a locking hinge coupled a first end of the telescoping shaft. A handle may be slidably and/or rotatably coupled to the locking hinge. A first wheel may be coupled to the head tube, and a second wheel may be rotatably coupled to the footboard.

In a first mode, the first wheel, second wheel, and head tube are configured to rotate to a first position wherein the first wheel, second wheel, and head tube are each received (at least partially) within the channel of the footboard. Further, the handle and telescoping shaft may each be configured to rotate to a second position wherein the handle and the telescoping shaft are each adjacent to, and extend along a longitudinal length of the footboard. The first mode may be referred to as a stowage mode.

In a second mode, the first wheel, second wheel, and head tube are configured to rotate to a third position wherein the first wheel and second wheel extend away from the footboard. Further, the handle and telescoping shaft may each be configured to rotate to a fourth position wherein the handle and telescoping shaft extend away from the footboard. The second mode may be referred to as a use mode.

The term "connected" or "coupled to" may include both direct coupling (in which two elements that are coupled to each other contact each other) and indirect coupling (in which at least one additional element is located between the two elements).

The term "substantially" or "generally" as used herein may be applied to modify any quantitative representation which could permissibly vary without resulting in a change in the basic function to which it is related.

Figure 1:
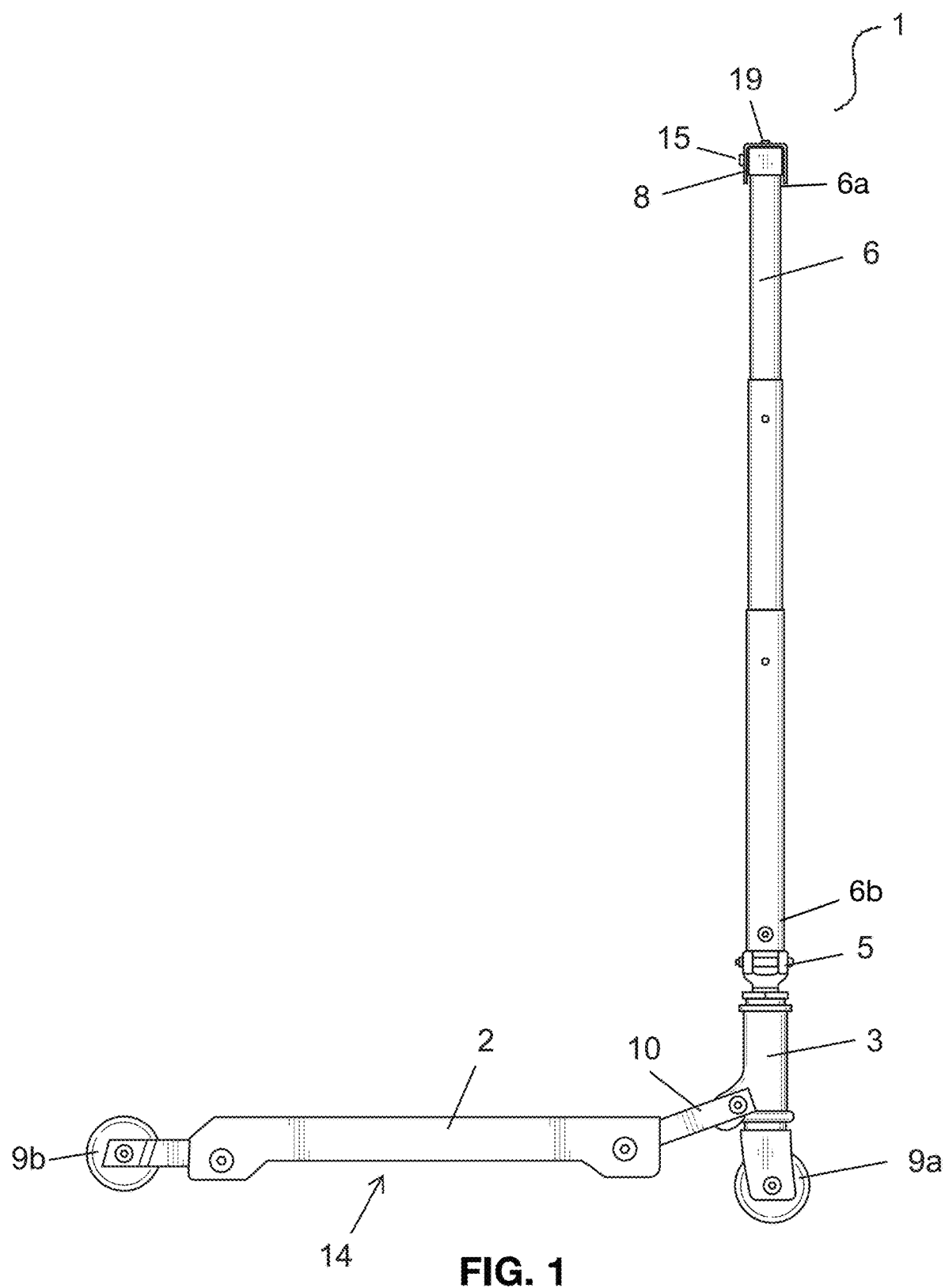
FIG. 1 shows a side view of an example collapsible scooter in an expanded mode (also referred to as a use mode), the collapsible scooter comprising a handle, a locking hinge, a telescoping shaft, another hinge, a head tube, a footboard, a front wheel, and a rear wheel.
Figure 2:
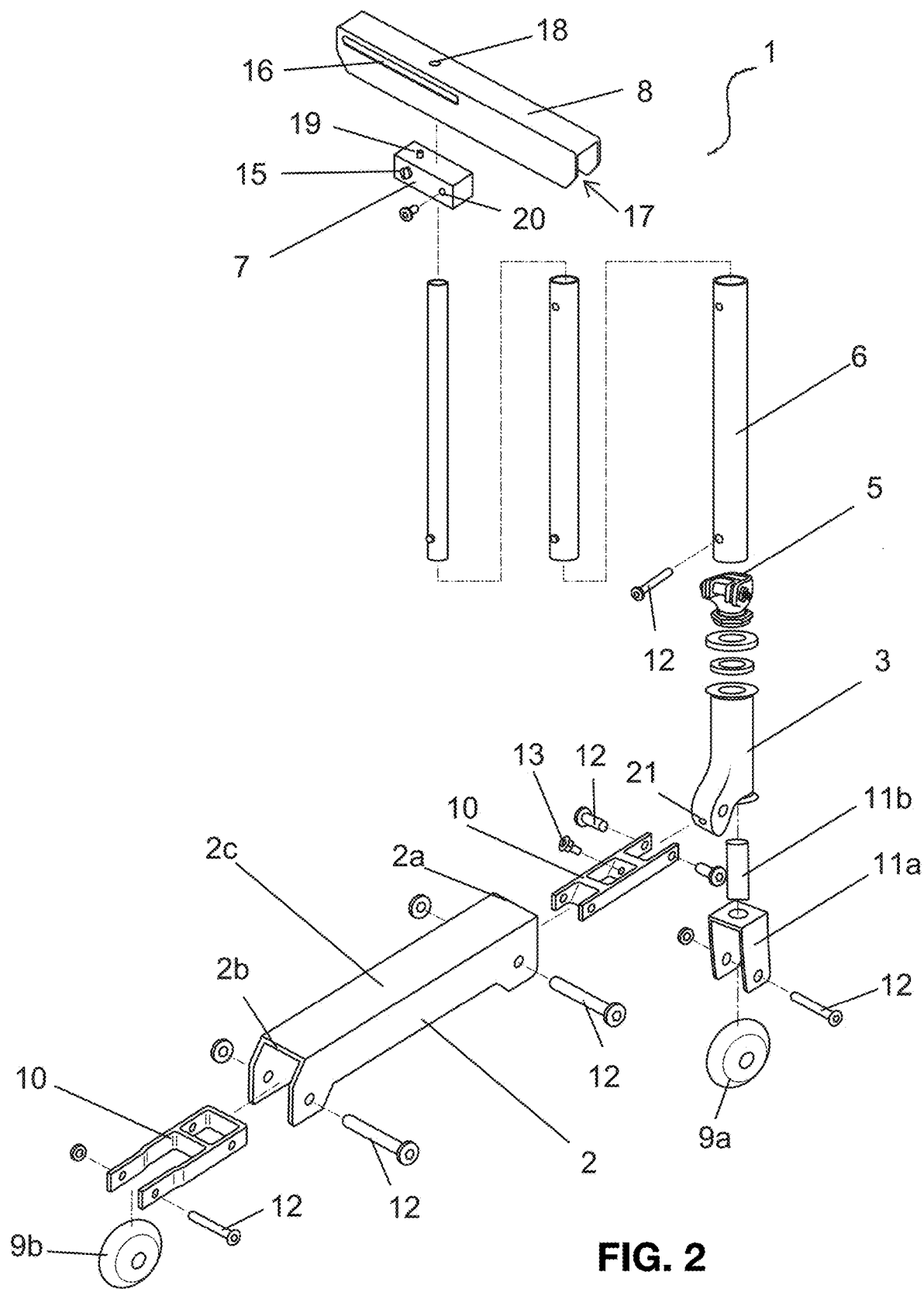
FIG. 2 shows an exploded perspective view of the example collapsible scooter of FIG. 1.

FIGS. 1 and 2 illustrate example collapsible scooter 1. Collapsible scooter 1 comprises a footboard 2 having a first end 2a (which may be referred to as a front end 2a) and a second end 2b (which may be referred to as a rear end 2b). Footboard 2 may comprise a surface 2c configured to interface with a user (i.e. is positioned to support a user on the top surface 108) during use of the collapsible scooter 1. The surface 2c may be referred to as a top surface 2c. Footboard 2 may define an undercarriage 2d which includes a channel 14, which may be configured to receive wheels 9a and 9b, and head tube 3. The wheels 9a and 9b may be referred to respectively as a front wheel 9a and a rear wheel 9b.

Head tube 3 may be hingedly coupled to the footboard 2. In an embodiment, head tube 3 is hingedly coupled to footboard 2 by double hinged bracket 10 and fasteners 12. Double hinged bracket 10 may comprise a locking pin 13 which may be biased to protrude through double hinged bracket 10 and be received by aperture 21 defined by head tube 3 when head tube 3 is at a desired angle relative to footboard 2. When locking pin 13 is received in aperture 21, head tube 3 may be fixed in position at the desired angle relative to footboard 2. Locking pin 13 may be withdrawn from aperture 21 manually by a user to allow head tube 3 to rotate relative to footboard 2.

Figure 7:
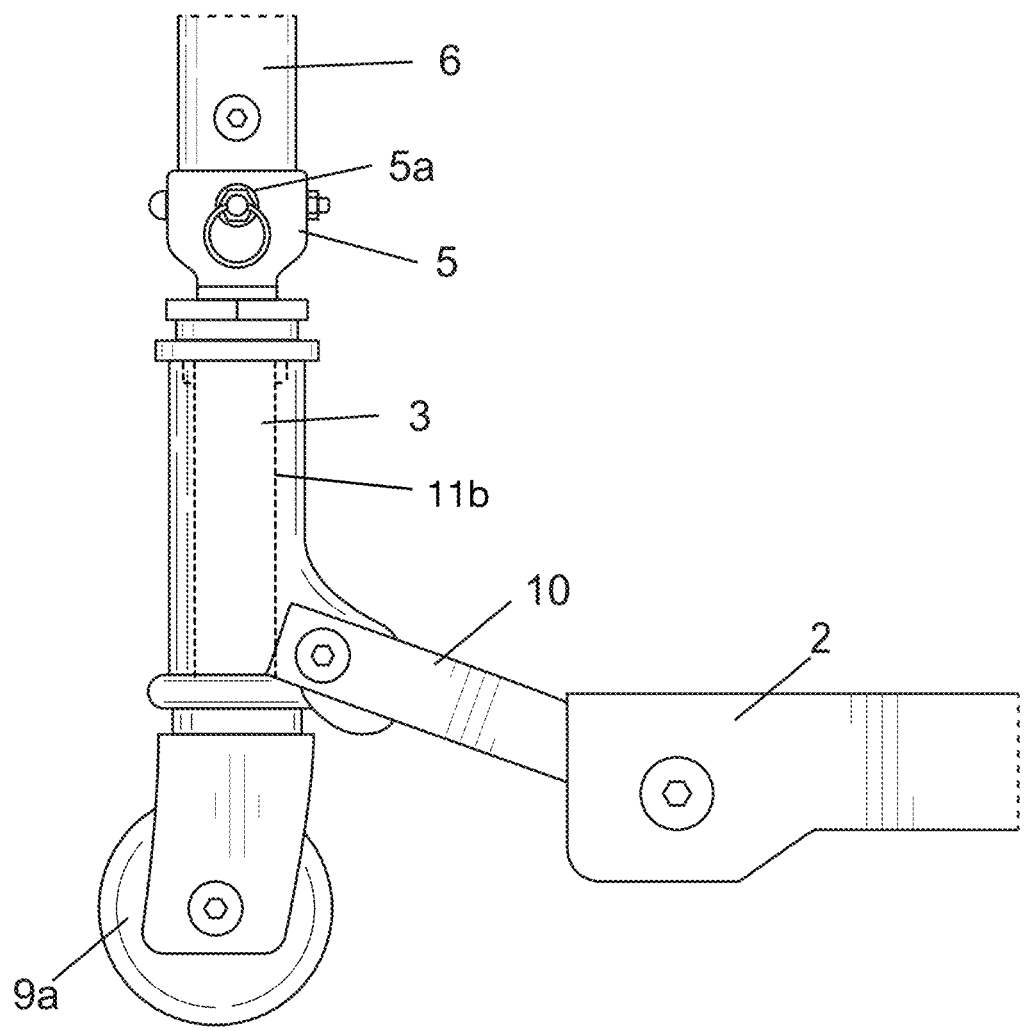
FIG. 7 is a side partial cut away view of the hinge, telescoping shaft, head tube, and footboard of FIG. 1.

Continuing the above example, as shown in FIGS. 1 and 2, a telescoping shaft 6 may have a first end 6a and a second end 6b. Telescoping shaft 6 may comprise a plurality of telescoping segments. In the example shown in FIGS. 1 and 2, telescoping shaft 6 comprises 3 segments; however, telescoping shaft 6 is not limited by the illustrated embodiment. Telescoping shaft 6 may be coupled at first end 6a to a locking hinge 5, and second end 6b may be hingedly coupled to the connection member 11b that is rotatably held in head tube 3 as shown in FIG. 7. More specifically, the second end 6b may be connected to the hinge 5, and the hinge 5 may include a threaded region that threadedly mounts to an end of the connection member 11b. Telescoping shaft 6 may thus be in mechanical communication with wheel 9a for rotating (i.e. pivoting) wheel 9a about the longitudinal axis of telescoping shaft 6 to steer collapsible scooter 1 when in use. In an embodiment, connection member 11b couples swivel caster 11a (and wheel 9a) to hinge 5 such that rotational movement of telescoping shaft 6 will steer wheel 9a.

Connection member 11b and swivel caster 11a may be integrally formed as a single piece. As shown in FIG. 2, connection member 11b may traverse through an interior of head tube 3 for coupling swivel caster 11a with a female half of hinge 5. A male half of hinge 5 may be configured to rotate telescoping shaft 6 relative to head tube 3, e.g. telescoping shaft 6 may be rotatable 180 degrees about the longitudinal axis of head tube 3 which may cause a corresponding rotation of wheel 9a. Hinge 5 may comprise a locking mechanism 5a (e.g. a pin received within an aperture (not shown) defined by telescoping shaft 6) to lock relative movement of the male half of locking hinge 5 with respect to the female half of locking hinge 5 for securing the telescoping shaft 6 at a desired angle 30 relative to the head tube 3. As shown in the example collapsible scooter of FIG. 1, the telescoping shaft 6 is secured along the same longitudinal axis as head tube 3.

While the term 'swivel caster' is used to describe element 11a, it will be understood that the wheel 9a, which is held therein, is not freely pivotable about the axis of the connection member 11b. The wheel 9a is steered by the pivoting of the telescoping shaft 6, whose angular position is controlled by the user via a handle 8.

Figure 4:
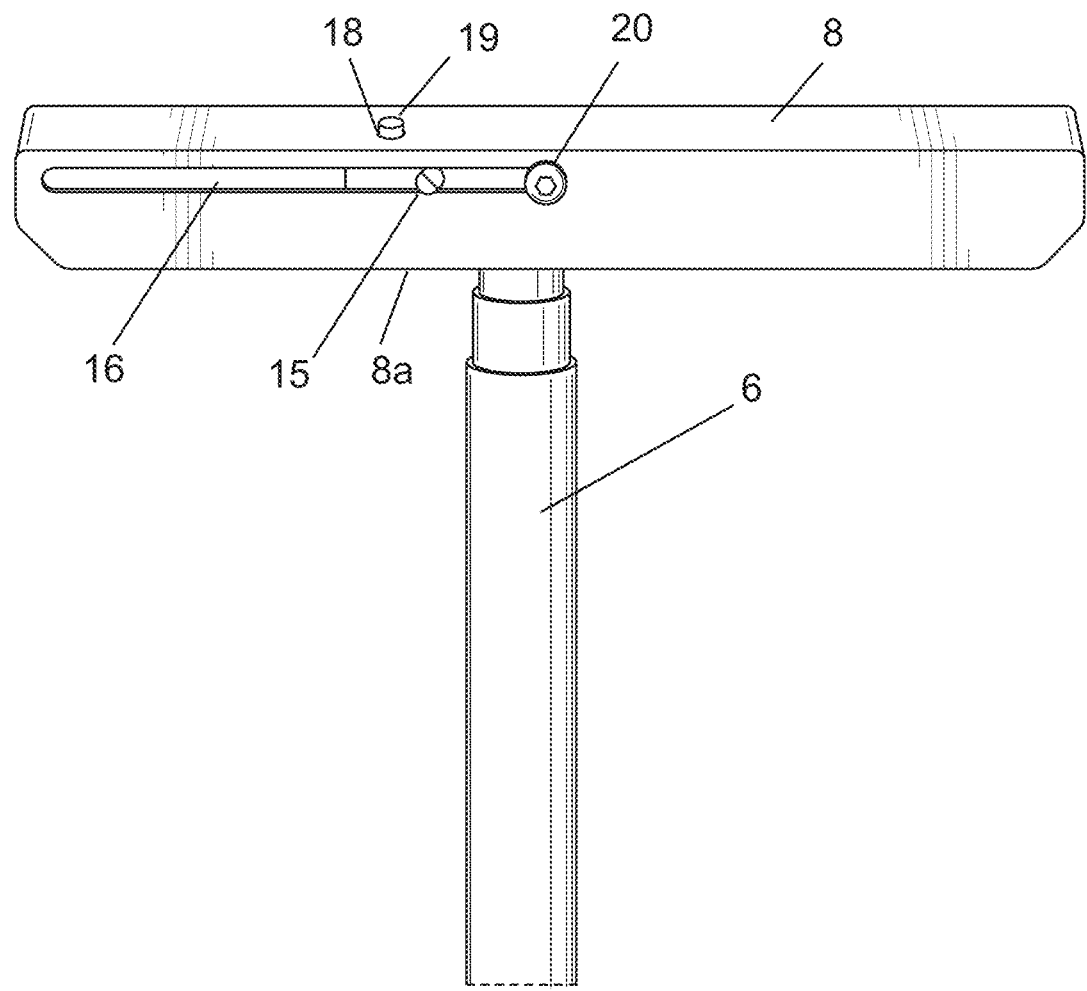
FIG. 4 is a front perspective view of the handle and the telescoping shaft of FIG. 1.
Figure 5:
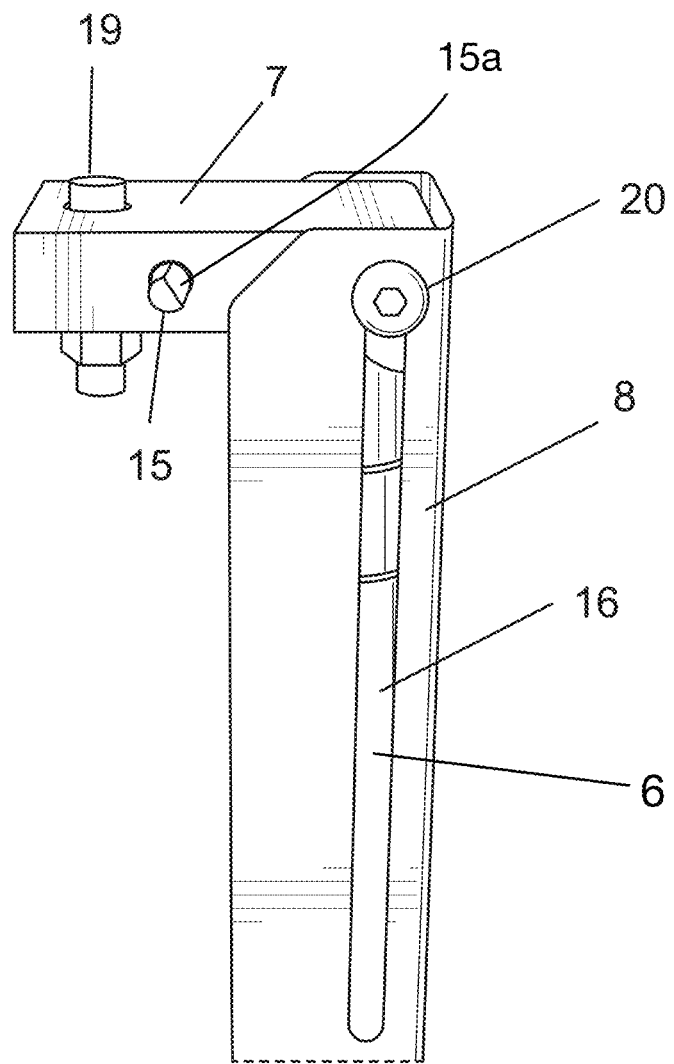
FIG. 5 is a front perspective view of the handle and the locking hinge of FIG. 1.
Figure 6:
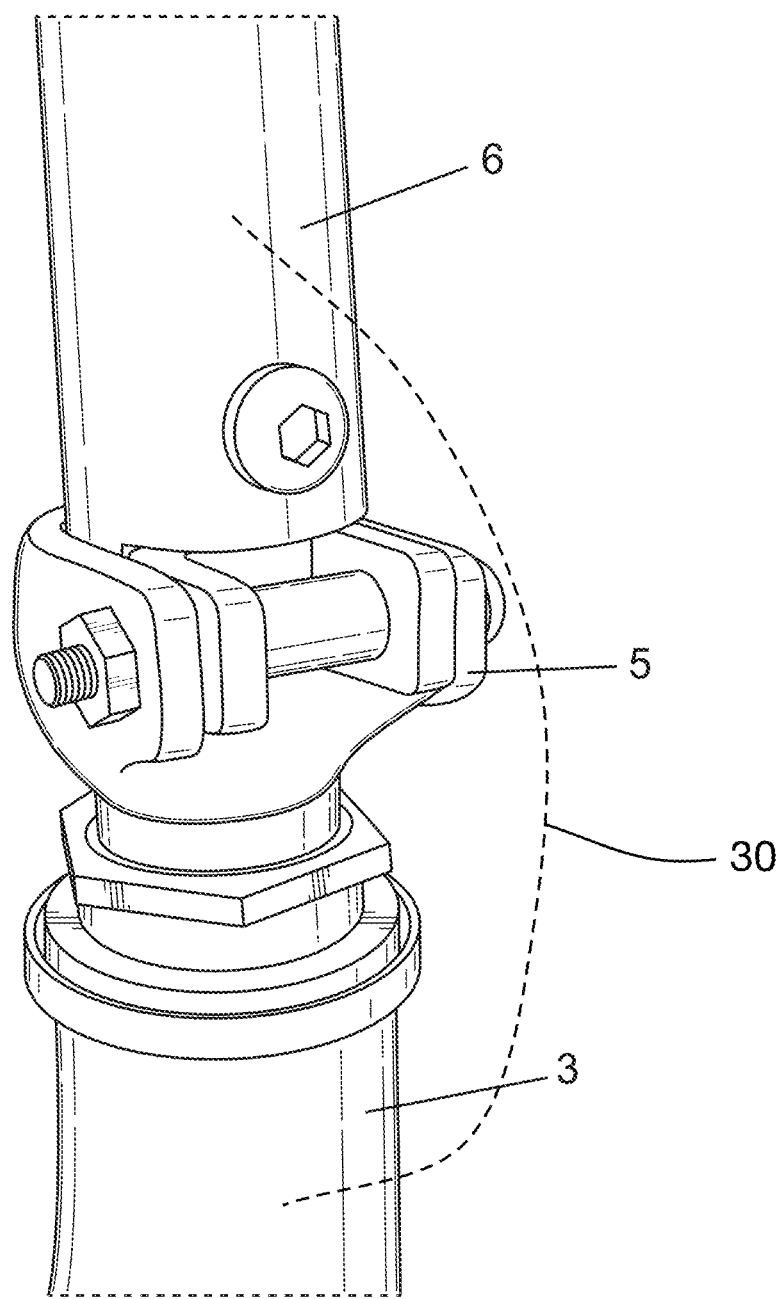
FIG. 6 is a perspective view of the hinge coupling the telescoping shaft and a connection member that is in the head tube of FIG. 1.

The handle 8 may be slidably coupled to, and rotatable about, locking hinge 7. Handle 8 may define handle channel 17 which may receive telescoping shaft 6 and/or locking hinge 7. In an embodiment, locking hinge 7 comprises locking hinge pivot 20 received in handle slot 16 defined by handle 8. Handle slot 16 may extend along a length of handle 8. As shown in FIGS. 2 and 4, handle slot 16 may extend along generally half the length of handle 8 such that locking hinge pivot 20 may transit between a central point of handle 8 (shown in FIG. 4) and a lateral end of handle 8 (shown in FIG. 5) such that handle channel 17 may receive telescoping shaft 6 and handle 8 may be positioned adjacent to telescoping shaft 6. As shown in FIG. 5, handle 8 and telescoping shaft 6 generally share a common longitudinal axis reducing the volume occupied by each element. Locking hinge 7 may comprise bit member 15 biased by a biasing member (not shown) such as a coil spring, leave spring, or similar element to bias bit member 15 to an extended position shown in FIGS. 4 and 5. Bit member 15 may be configured to be received a handle slot 16 for securing handle 8 in a position generally perpendicular to telescoping shaft 6. Bit member 15 may be configured to be biased by the biasing member to extend through the handle slot 16 when bit member 15 is received within handle slot 16 to restrict rotation of handle 8 about the locking hinge pivot 20. In an embodiment, bit member 15 may comprise an angled surface 15a, the angled surface 15a disposed at an angle relative to a counterpart surface 8a of handle 8. When handle 8 and counterpart surface 8a thereof, is rotated into contact with angled surface 15a, bit member 15 is forced into locking hinge 7, compressing the biasing member axially, until bit member 15 is aligned with handle slot 16 as shown in FIG. 4. Alignment of bit member 15 with handle slot 16 may restrict rotational movement of handle about locking hinge pivot 20.

In an embodiment, lateral movement of handle 8 relative to locking hinge 7 may be restricted by engagement of locking member 19 and first aperture 18. Locking hinge 7 may comprise locking member 19 configured to extend into first aperture 18 defined by handle 8. When handle 8 rotates about locking hinge pivot 20, first aperture 18 may receive locking member 19 to restrict lateral movement of the handle relative to the locking hinge.

As shown in FIGS. 1, 3, 7, 8, and 9, first wheel 9a may be coupled to head tube 3, for example by swivel caster 11a and fasteners 12. In an embodiment, first wheel 9a and telescoping shaft 6 are in mechanical communication such that rotation of telescoping shaft 6 about its longitudinal axis causes a corresponding rotation of first wheel 9a.

Figure 3:
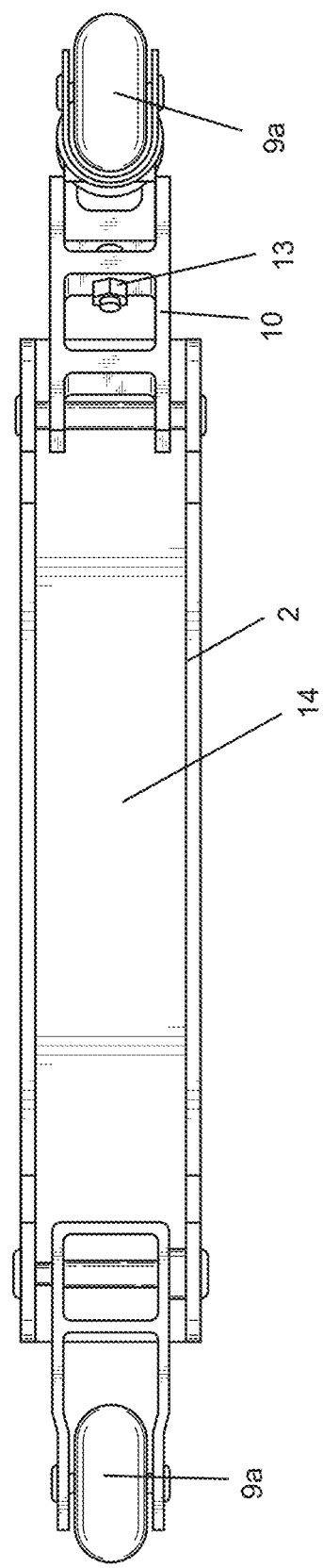
FIG. 3 shows a bottom view of the example collapsible scooter of FIG. 1.
Figure 10:
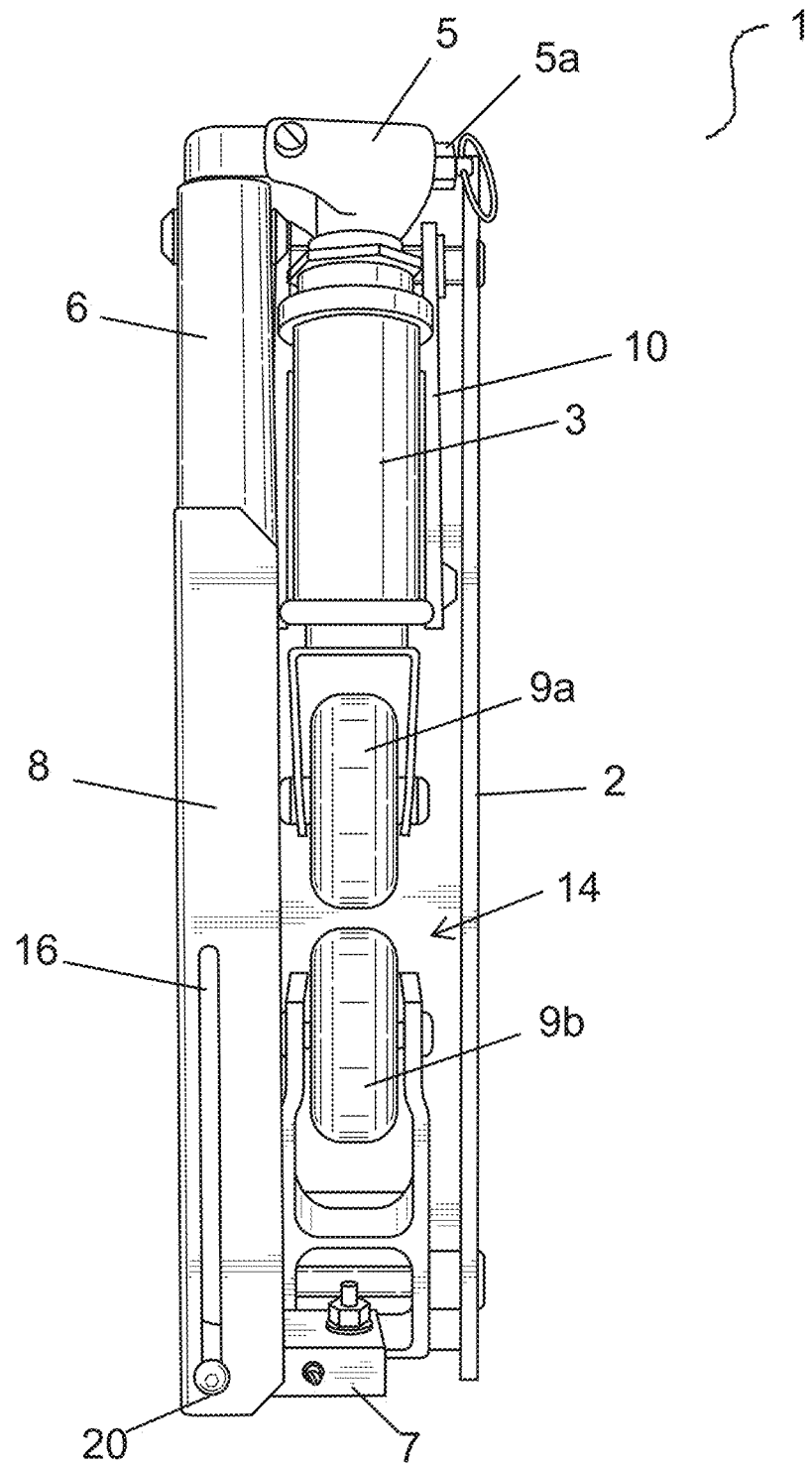
FIG. 10 is a bottom view of the collapsible scooter in a collapsed mode.

As shown in FIGS. 1 and 3 a second wheel 9b may be coupled to footboard 2. Second wheel 9b may be hingedly coupled to footboard 2 by a bracket. As shown in FIG. 10, second wheel 9b may be rotatable about footboard 2 and configured to be received by footboard channel 14.

In a first mode, collapsible scooter 1 is configured to collapse/fold into a decreased volume. As shown in FIG. 10, the arrangement of components of collapsible scooter 1 occupies a reduced volume in comparison to collapsible scooter 1 in its expanded arrangement shown in FIG. 1. In the first mode (shown in FIG. 10), first wheel 9a, second wheel 9b, and head tube 3 are configured to rotate to a first position wherein the first wheel 9a, second wheel 9b, and head tube 3 are each received within footboard channel 14. In an embodiment, in the first position, double hinged bracket 10 rotates about a hinge into channel 14 and head tube 3 rotates about the other hinge of double hinged bracket 10 to overlay head tube 3 on double hinged bracket 10 within channel 14. Second wheel 9b may also be rotated about its bracket 10 into channel 14.

Further, in the first mode, handle 8 and telescoping shaft 6 are each configured to rotate to a second position wherein handle 8 and telescoping shaft 6 are each adjacent to, and extend along a longitudinal length of footboard 2. In an embodiment, the plurality of segments of telescoping shaft 6 are collapsed and rotated about hinge 5 to extend adjacent to and along a longitudinal length of head tube 3. When head tube 3 is rotated to the first position within channel 14, telescoping shaft 6 may also extend adjacent to and along a longitudinal length of footboard 2. In an embodiment, as shown in FIG. 5, handle 8 may rotate about locking hinge pivot 20 to overlay handle 8 on telescoping shaft 6. As shown in FIG. 10, telescoping shaft 6 may be defined within handle channel 17.

Figure 8:
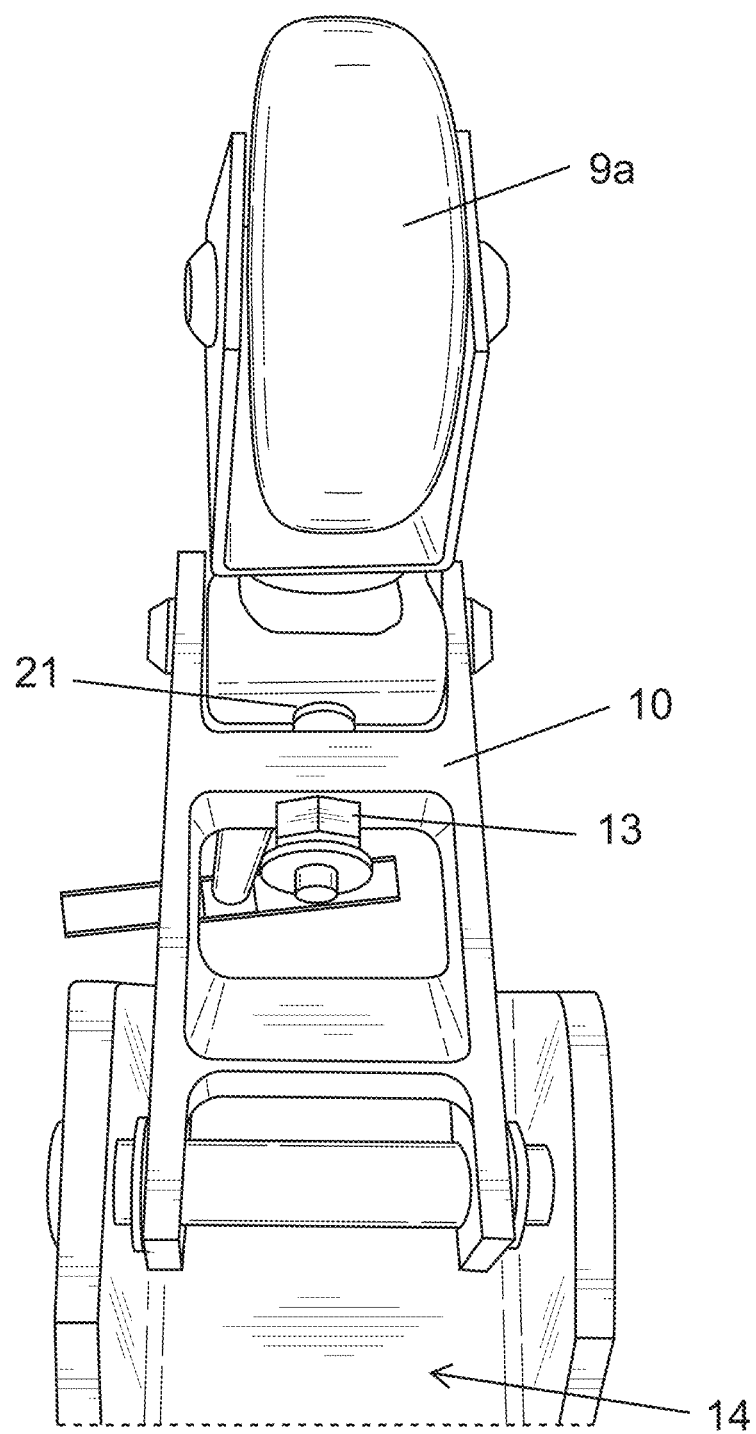
FIG. 8 is a bottom partial cut away view of the front wheel rotatably coupled to the footboard of FIG. 1.
Figure 9:
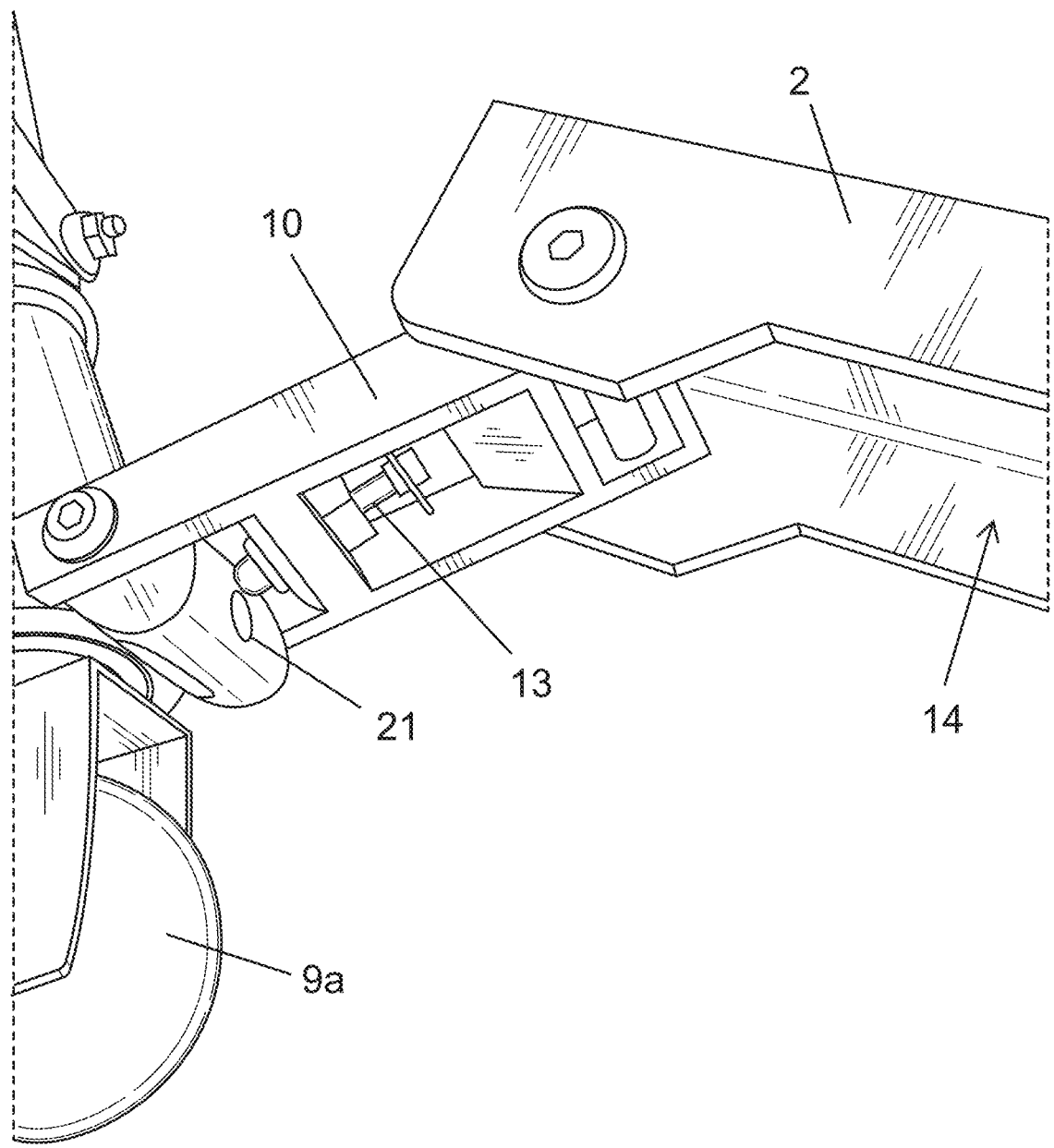
FIG. 9 is a perspective view of the front wheel rotatably coupled to the footboard of FIG. 1.

In a second mode, the first wheel 9a, second wheel 9b, and head tube 3 are configured to rotate to a third position. In the third position, shown in FIGS. 1, 3, 7 and 8, first wheel 9a and second wheel 9b extend away from footboard 2 such that a user may stand on board 2 and wheels 9a, 9b are in contact with the ground. In an embodiment, first wheel 9a and head tube 3 may be rotated about footboard 2 via double hinged bracket 10. As shown in FIGS. 8 and 9, double hinged bracket 10 may comprise locking pin 13 biased to extend into second aperture 21 of head tube 3 to prevent head tube 3 rotating about double hinged bracket 10.

Further, in the second mode, handle 8 and telescoping shaft 6 are each configured to rotate to a fourth position wherein handle 8 and telescoping shaft 6 extend away from the footboard. In the fourth position, telescoping shaft 6 may be rotated about hinge 5 to co-align its longitudinal axis with head tube 3. Head tube 3 may extend in a direction perpendicular to footboard 2 (e.g. generally upward when a user is standing on footboard 2). As shown in FIG. 4, handle 8 may be rotated about locking hinge pivot 20 to be positioned generally perpendicular to telescoping shaft 6. In an embodiment, bit member 15 may be configured to be received by handle slot 16 for securing handle 8 in the fourth position generally perpendicular to telescoping shaft 6. In an embodiment, in the fourth position, the telescoping shaft is in mechanical communication with the first wheel, wherein rotation of the telescoping shaft about its longitudinal axis causes a corresponding rotation of the first wheel 9a. The telescoping shaft 6, the hinge 5, the connection member 11b and the swivel caster 11a may be referred to all together as a steering member.

Reference is made to FIG. 11, which shows a collapsible scooter 100 in accordance with an embodiment of the present disclosure. The collapsible scooter 100 includes a footboard 102. The footboard 102 defines a longitudinal axis A for the collapsible scooter 100 and has a front end 104, a rear end 106, a top surface 108, and a bottom region 110 (which may also be referred to as an undercarriage 110). The footboard 102 is positioned to support a user on the top surface 108 during use of the collapsible scooter 100. The footboard 102 may optionally include a plurality of walls shown at 112 (FIG. 20) that extend downwards, which cooperate to define at least one longitudinally-extending channel 114 on the bottom region 110. In the embodiment shown, there are four walls 112, and as a result, the bottom region 110 in the embodiment shown includes three longitudinally-extending channels 114.

The collapsible scooter 100 has a first wheel 122 (which may also be referred to as a front wheel 122) that is rotatably connected at least indirectly to the footboard 102. In the embodiment shown, the collapsible scooter 100 further includes a front bridge 124 that has a first front bridge end 126 and a second front bridge end 128. In the embodiment shown, the front bridge 124 is hingedly connected at the second front bridge end 128 to the footboard 102 for movement (e.g. pivoting movement) between a front bridge use position (FIGS. 11-14) in which the first front bridge end 126 is positioned forward of the front end 104 of the footboard 102, and a front bridge stowage position (FIGS. 15-19) in which the first front bridge end 126 is positioned rearward of the front end 104 of the footboard 102. As can be seen, the front bridge 124 may be positioned adjacent one of the top and bottom regions 108 and 110 of the footboard 102 when in the front bridge stowage position. The hinged connection (shown at 129 in FIG. 15) between the front bridge 124 and the footboard 102 may be a simple pin joint. The front bridge 124 may be supported in the front bridge use position by engagement of the front bridge 124 with a support surface on the bottom region 110 of the footboard 102.

The collapsible scooter 100 has a second wheel 130 (which may also be referred to as a rear wheel 130) that is rotatably connected at least indirectly to the footboard 102. The collapsible scooter 100 may optionally include a rear bridge 131 that has a first rear bridge end 132 and a second rear bridge end 134. The rear bridge 131 may be hingedly connected at the second rear bridge end 134 to the footboard 102 for movement (e.g. pivotal movement) between a rear bridge use position (FIGS. 11-13) in which the first rear bridge end 132 is positioned rearward of the rear end 106 of the footboard 102, and a rear bridge stowage position (FIGS. 14-19) in which the first rear bridge end 132 is positioned forward of the rear end 106 of the footboard 102. In the embodiment shown, the second wheel 130 is rotatably connected to the rear bridge 131. The hinged connection (shown at 136) between the rear bridge 131 and the footboard 102 may be a simple pin joint.

The front bridge 124 and the rear bridge 131 effectively lengthen the wheelbase of the collapsible scooter 100 (i.e. the distance between the front and rear wheels 122 and 130), which can aid in stability during riding of the collapsible scooter 100 by a user. Furthermore, by permitting the front bridge 124 and the rear bridge 131 to move to their respective front bridge stowage and rear bridge stowage positions, the overall length of the collapsible scooter 100 when in a stowage mode can be reduced as compared to other prior art kick scooters, which aids in portability.

It is particularly innovative for the front bridge 124 to be movable to its stowage position as the front bridge has a head tube 138 connected thereto, with a steering member 137 therein. The head tube 138 is a tubular member that defines a steering axis As.

The steering member 137 passes through the head tube 138 and is pivotable therein about the steering axis As. The steering member 137 has a first steering member end 142 and a second steering member end 144. The first steering member end 142 has the first wheel 122 rotatably connected thereto, and the second steering member end 144 has a handle 146 positioned for gripping by a user.

The head tube 138 may be hingedly connected to the front bridge 124 for movement (e.g. pivoting movement) between a head tube use position (FIGS. 11-14) and a head tube stowage position (FIGS. 15-19). When the front bridge 124 is in the front bridge use position and the head tube 138 is in the head tube use position, the head tube 138 is positioned forward of the footboard 102 and is oriented such that the steering axis As is approximately perpendicular to the top surface 108 of the footboard 102. When the head tube 138 is in the head tube stowage position, the head tube 138 is positioned rearward of the front end 104 of the footboard 102 (for greater compactness of the collapsible scooter 100 when in a stowage mode). The hinged connection (shown at 140) between the head tube 138 and the front hinge 124 may be a simple pin joint. The hinged connection 140 may be at the first front bridge end 126. As can be seen in FIGS. 15-19, when the front bridge 124 and the head tube 138 are in their respective stowage positions, they form a z-shape with the footboard 102. In other words, when in their respective stowage positions the front bridge 124 extends generally rearwardly from the hinged connection 129 and the head tube extends generally forwardly from the hinged connection 140. It can be seen in the Figures that in the front bridge stowage position the front bridge 124 is positioned adjacent the bottom region 110 of the footboard 102 and, in the head tube stowage position, the head tube 138 is positioned such that the front bridge 124 is positioned in between (i.e. vertically in between) the footboard 102 and the head tube 138.

To hold the head tube 138 in the head tube use position, the collapsible scooter 100 may include at least one head tube locking pin 190 (FIG. 23). In the embodiment shown there are two head tube locking pins 190 (see FIG. 24). Each head tube locking pin 190 is biased towards a locking position in which the head tube locking pin 190 engages a respective use position locking aperture 192 in the front bridge 124. The head tube locking pins 190 may be biased towards their respective locking positions by a head tube locking pin biasing member 194 that is, in the example shown in FIG. 24, a helical compression spring that extends between support structures 196 for the two head tube locking pins 190. The biasing member 194 could alternatively be any other suitable type of biasing member. To release the head tube 138 from the head tube use position, the user presses the head tube locking pins 190 inwardly towards one another, overcoming the biasing member 194, and then starts to pivot the head tube 138 out of the head tube use position, towards the head tube stowage position. The front bridge 124, as shown in FIG. 23, may further include a head tube stowage position locking aperture 197 which is positioned to receive the head tube locking pin 190 and to hold the head tube 138 in the head tube stowage position.

To support the head tube 138 in the head tube use position against the weight of the user on the footboard 102, the front bridge 124 may include a front bridge limit surface 198 that engages a head tube limit surface 199 on the head tube 138. The limit surfaces 198 and 199 engage one another so as to limit the amount of weight is supported by the engagement of the head tube locking pins 190 with the head tube use position locking apertures 192.

In a use mode for the collapsible scooter 100 (FIG. 11), the front bridge 124 is positioned in the front bridge use position and the head tube 138 is positioned in the head tube use position, and the first and second wheels 122 and 130 are positioned to support the footboard 102 above a ground surface (shown at G in FIG. 11). In a stowage mode for the collapsible scooter (FIG. 19), the front bridge 124 is positioned in the front bridge stowage position and the head tube is positioned in the head tube stowage position.

Several optional features may be provided for the steering member 137. For example, the steering member 137 may include a first telescopic portion 148 and a second telescopic portion 150 that is telescopically connected to the first portion 148. For example, the first telescopic portion 148 may be tubular and the second telescopic portion 150 may be slidable inside the first telescopic portion 148 so as to be retractable and extendable relative to the first telescopic portion 148. Alternatively, the second telescopic portion 150 may be tubular and may slide over the first telescopic portion 148 so as to be retractable and extendable relative to the first telescopic portion 148. In the embodiment shown, the first telescopic portion 148 includes the part of the steering member 137 that passes through and is therefore pivotally connected with the head tube 138. The handle 146 is provided on the second telescopic portion 150. In other words, the second telescopic portion 150 has the second steering member end 144 thereon.

In order to lock the second telescopic portion 150 in the extended or retracted positions, collar clamp 151 may be provided, as is known in the art of kick scooters.

Figure 17:
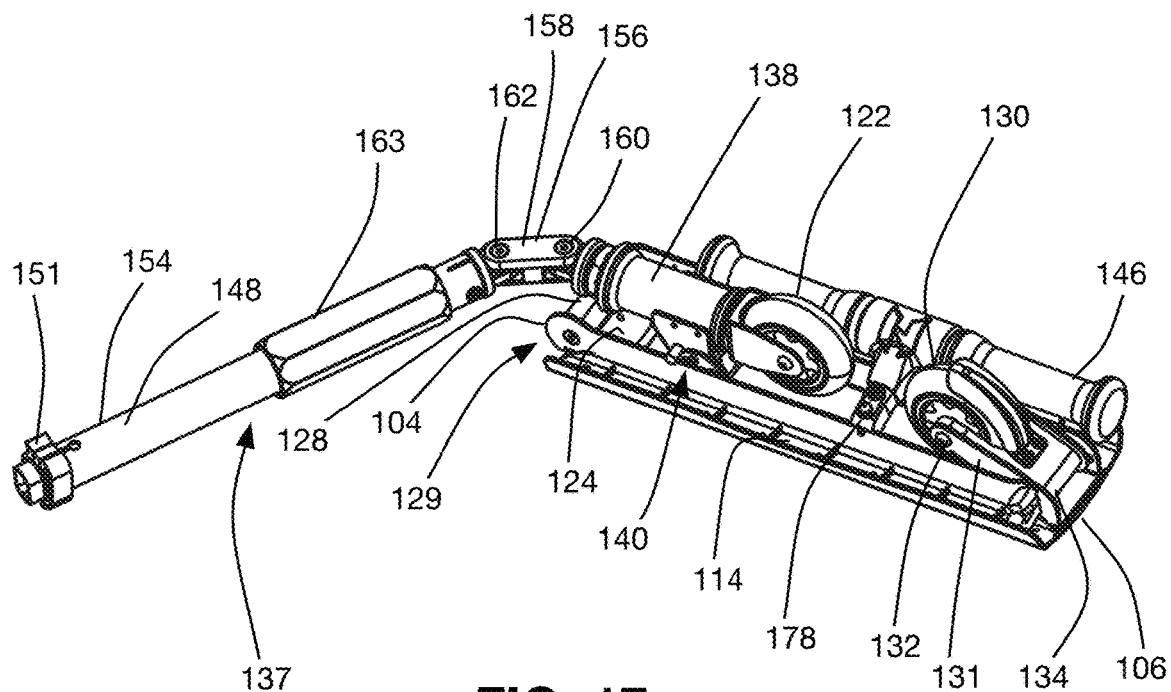
Figure 18:
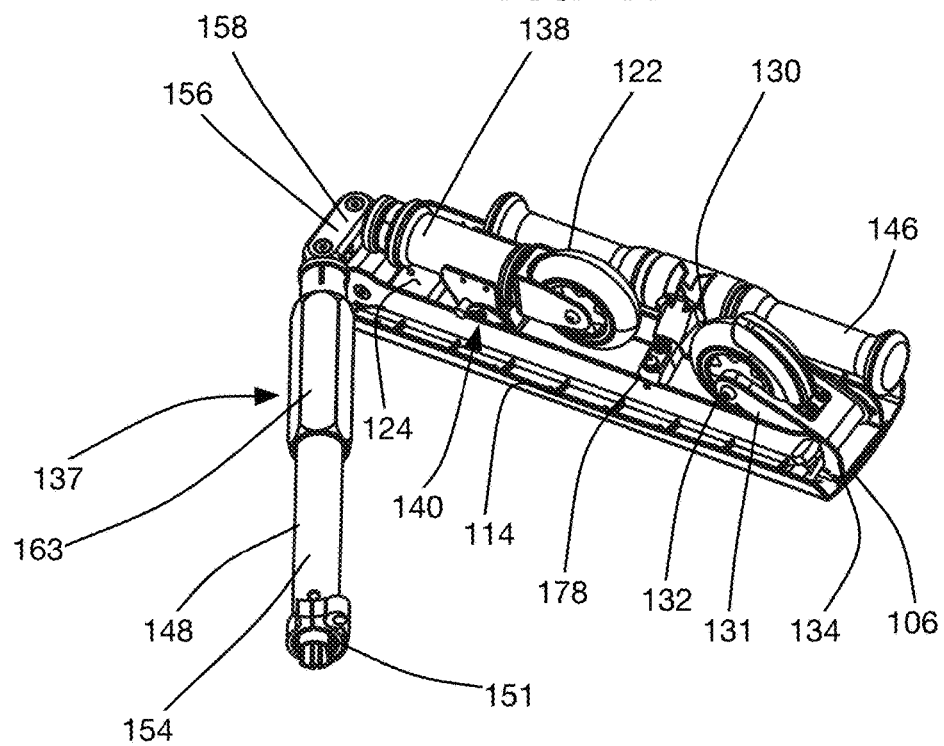

Another optional feature is for the steering member 137 to include a first hinged portion 152 and a second hinged portion 154. The first hinged portion 152 passes through the head tube 138. In other words, the part of the steering member 137 that is pivotally connected with the head tube 138 is on the first hinged portion 152. The second hinged portion 154 is hingedly connected to the first hinged portion 152 by a steering member hinge 156 for movement between a hinged portion use position (FIGS. 11-16) in which the second hinged portion 154 is aligned with the first hinged portion 152 along the steering axis As and a hinged portion stowage position (FIG. 19) in which the second hinged portion 154 is folded to be adjacent to the first hinged portion 152. FIGS. 17 and 18 illustrate the folding of the second hinged portion 154 relative to the first hinged portion 152 towards the hinged portion stowage position in FIG. 19. In embodiments in which both the steering member hinge 156 and the telescopic connection are provided, the second hinged portion includes the first telescopic portion 148 and the second telescopic portion 150.

In the embodiment shown, the steering member hinge 156 may be what is referred to as a double hinge, and thus includes a hinge link 158 that has a first hinge link end 160 (FIGS. 16 and 21) that is pivotally connected (e.g. by means of a pin joint) to the first hinged portion 152 of the steering member 137, and a second hinge link end 162 that is pivotally connected (e.g. by means of a pin joint) to the second hinged portion 154 of the steering member 137.

In some embodiments, the second hinged portion 154 is generally cylindrical, and has a diameter D (FIG. 21), and when the steering member hinge 156 is in the hinged portion use position, the entirety of the steering member hinge 156 (particularly in embodiments in which it employs the hinge link 158) remains within the diameter D of the second hinged portion 154. This permits the steering member 137 to employ a hinge sleeve 163 to lock the second hinged portion 154 in the hinged portion use position. The hinge sleeve 163 may be movable between a locking position (FIGS. 11-15) in which the hinge sleeve 163 extends over some of the first hinged portion 152 of the steering member 137 and over some of the second hinged portion 154 of the steering member 154 so as to hold the first and second hinged portions 152 and 154 in alignment with the steering axis As, and an unlocking position (FIGS. 16-19) in which the hinge sleeve 163 extends along only one of the first and second hinged portions 152 and 154), so as to permit movement of the second hinged portion 154 between the hinged portion use position and the hinge portion stowage position. In the embodiment shown, when the hinge sleeve 163 is in the unlocking position, the hinge sleeve extends along only the second hinged portion 152.

As can be seen in FIG. 21, the hinge sleeve 163 may have a first hinge sleeve end 164 and a second hinge sleeve end 165, and has a hinge sleeve abutment shoulder 166 at one of the first and second hinge sleeve ends 164 and 165 (in the example shown, the first hinge sleeve end 164) that is positioned to abut a steering member abutment shoulder 168 on one of the first and second hinged portions 152 and 154 (in the example shown, the first hinged portion 152). The hinge sleeve 163 further includes a hinge sleeve threaded region 170 at the other of the first and second hinge sleeve ends 164 and 165 (in the example shown, the second hinge sleeve end 165), that is positioned to engage a steering member threaded region 172 on the other of the first and second hinged portions 152 and 154 (in the example shown, the second hinged portion 154). The threaded regions 170 and 172 are provided so that, engagement of the threaded region 170 with the threaded region 172 drives the hinge sleeve abutment shoulder 166 to abut the steering member abutment shoulder 168 with sufficient force to place the hinge link 156 in tension between the first and second hinged portions 152 and 154, so as to take up any play present between the hinge link 156 and the first hinged portion 152 and between the hinge link 156 and the second hinged portion 154. There is also provided an optional steering member alignment surface shown at 174 on the steering member 137 that is positioned to engage a hinge sleeve alignment surface 176 on the hinge sleeve 166 when the hinge sleeve 166 is in the locking position to ensure that the hinge sleeve 156 remains concentric about the steering axis As and does not inadvertently disengage from the steering member abutment shoulder 168 in the event of, for example, an impact by something against the hinge sleeve 166. The steering member alignment surface 174 is shown as a radially outer surface, and the hinge sleeve alignment surface 176 is shown as a radially inner surface, however, it is alternatively possible for the steering member alignment surface 174 to be a radially inner surface, and for the hinge sleeve alignment surface 176 to be a radially outer surface.

The handle 146 may be connected to the second steering member end 144 in any suitable way. In the embodiment shown, the handle 146 includes a handle stem 178 that has a ball plunger 180 (FIG. 22). The handle 146 is thus removably mountable to the steering member 137. To mount the handle 146 to the steering member 137 the handle stem 178 is inserted into a receiving aperture 179 in the steering member 137 until the ball from the ball plunger 180 projects into an aperture 182 in the steering member 137. To remove the handle 146 from the steering member 137, the ball from the ball plunger 180 is pushed inwardly by the user so as to permit the user to move the handle in order to bring the ball plunger 180 away from the receiving aperture 179 thereby permitting the user to pull the handle 146 out from the receiving aperture 179. In other embodiments, the handle 146 may be fixedly mounted to the steering member 137. In such embodiments, the handle 146 may employ movable portions such as bar ends that fold down in order to take up less room. In yet another example, the handle 146 may be similar to the handle 8 and may thus be slidably coupled to, and rotatable about, a locking hinge similar to the locking hinge 7, which itself is connected to the second end 144 of the steering member 137.

The handle 146 is shown as including two bar ends that extend laterally outwards from the steering member 137. However other shapes may alternatively be provided, such as a ring shape. As yet another alternative, the handle could simply be the second end 144 of the steering member 137, optionally with a rubberized grip sleeve provided thereon.

As can be seen in FIG. 19, when the collapsible scooter 100 is in the stowage mode, the collapsible scooter 100 occupies a small volume, as compared to some kick scooters of the prior art. As can be seen, the front bridge 124, when in the front bridge stowage position, the rear bridge 131, when in the rear bridge stowage position, and the head tube 138, when in the head tube stowage position, are all positioned at least partially in the at least one channel 114. Furthermore, in the embodiment shown, the steering member 137, when the second hinged portion 154 is in the hinged portion stowage position, (and the second hinged portion in particular) is positioned at least partially in the at least one channel 114. Furthermore, in embodiments in which the steering member 137 includes both the steering member hinge 156 and is telescopic, the second telescopic portion 150 may be retracted such that the second steering member end 144 does not extend rearward of the rear end 106 of the footboard 102 (i.e. the second steering member end 144 sits between the front end 104 and the rear end 106).

Still furthermore, the handle 146 may also be positioned at least partially within the at least one channel 114 when the collapsible scooter 100 is in the stowage mode. In the embodiment shown, the handle 146, when removed from the second steering member end 144, fits snugly within a handle receiving region 184 of the at least one channel, such that the handle 146 is captured and does not simply fall out of the at least one channel under its own weight.

Figure 12:
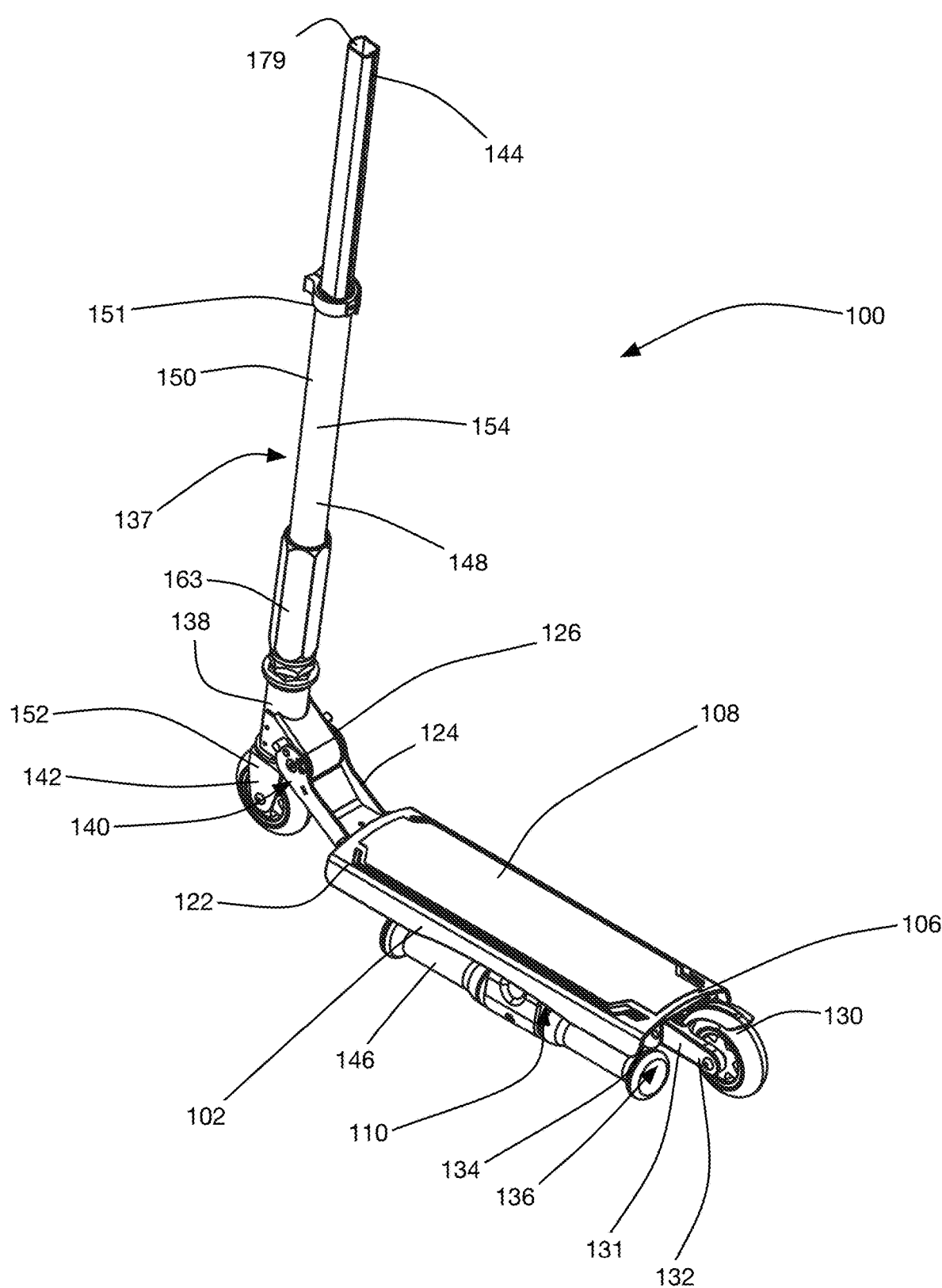

The progression of FIGS. 11 to 19 may be described as follows:

FIG. 11, as noted above, is the cs 100 in the use mode. FIG. 12 is similar to FIG. 11, but shows that the handle 146 has been removed from the steering member 137 and inserted in its place on the footboard 102. It is alternatively possible for the handle 146 to remain on the steering member 137 until later on in the collapsing process.

Figure 13:
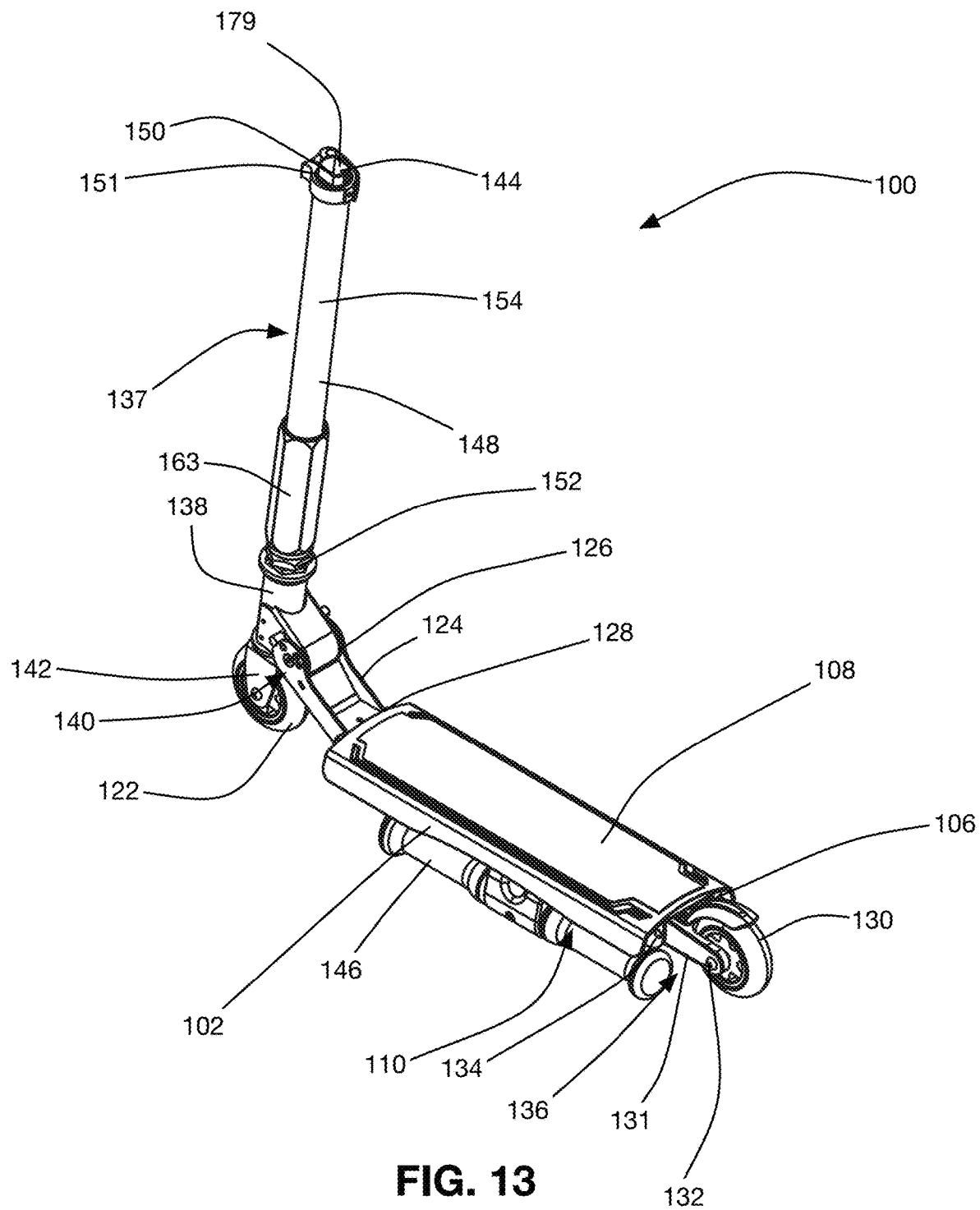
Figure 14:
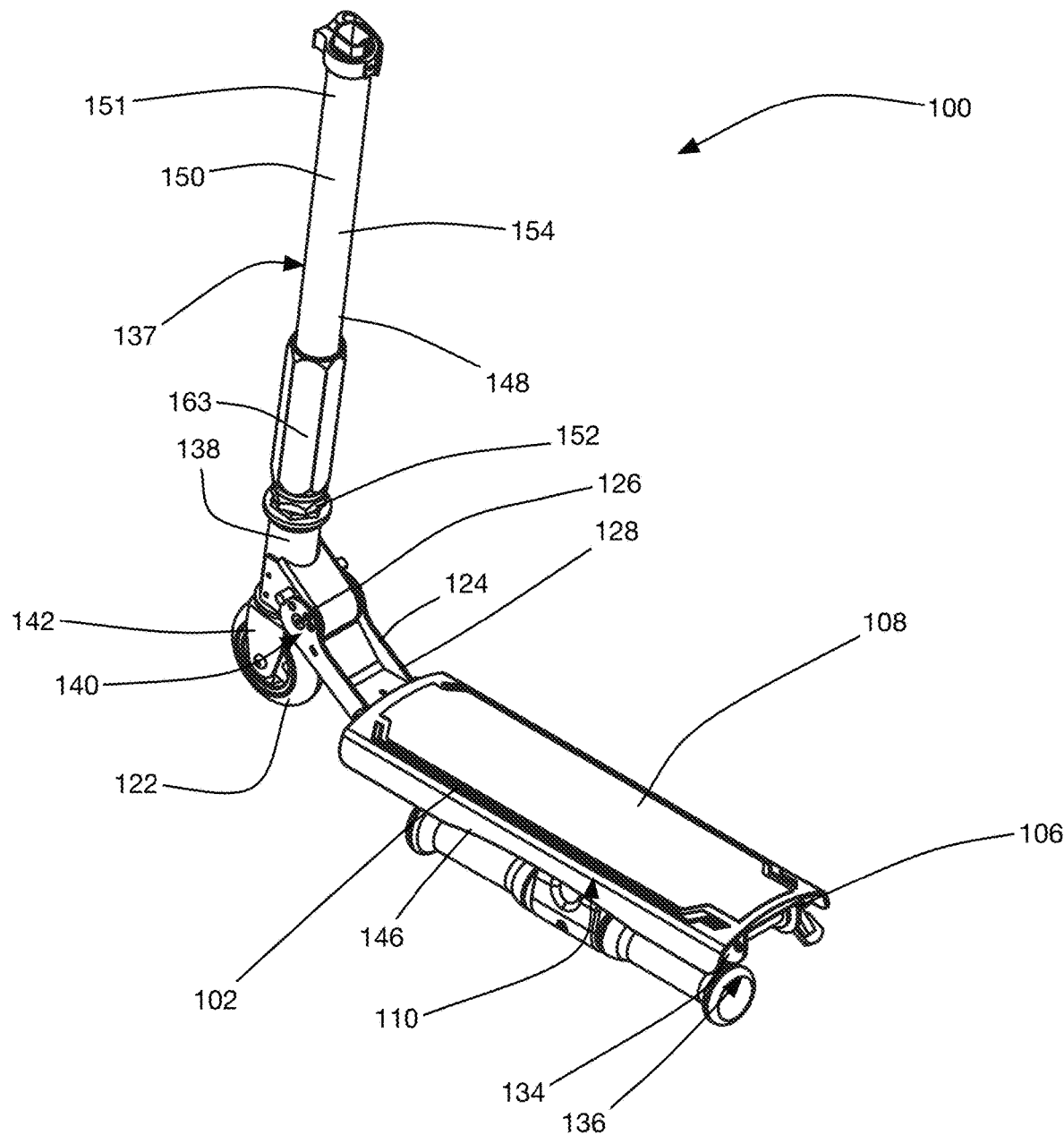

FIG. 13 shows that the second telescopic portion 150 has been moved to its retracted position. FIG. 14 shows that the rear bridge 131 has been moved to the rear bridge stowage position.

Figure 15:
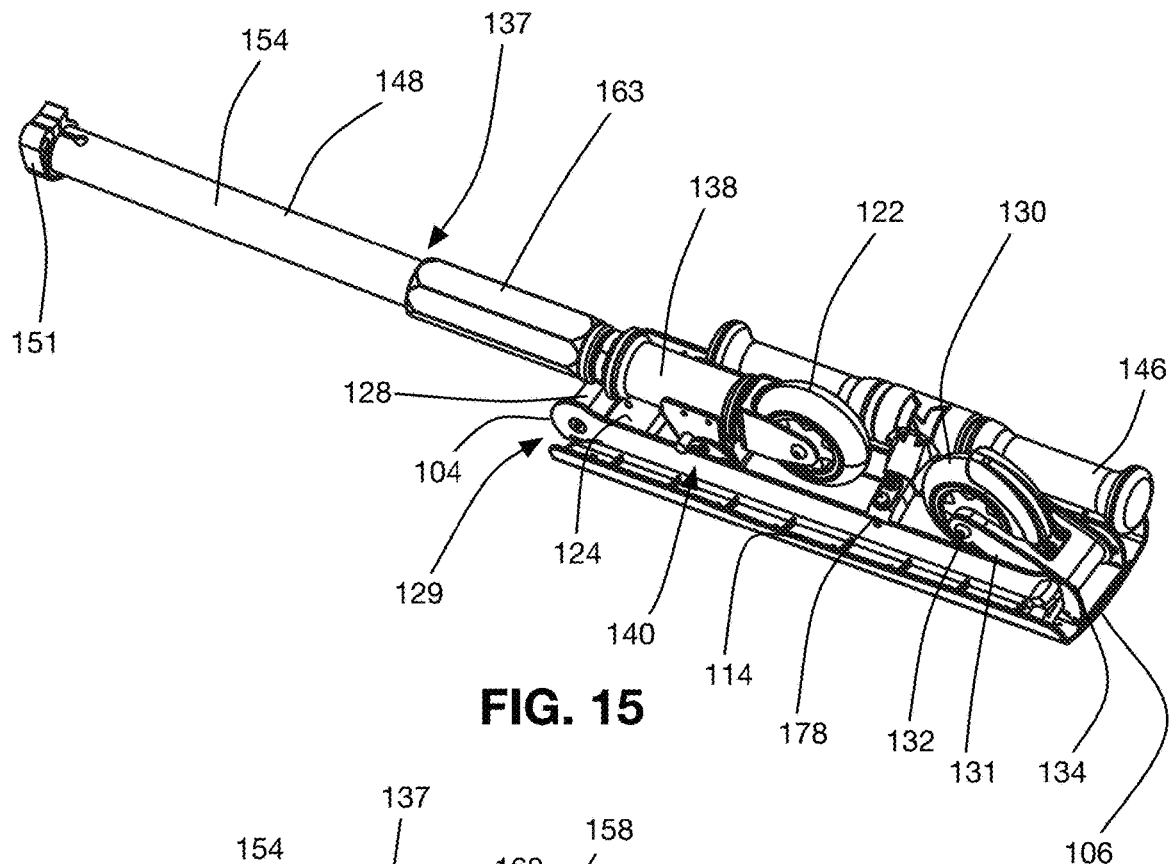

FIG. 15 shows that the front bridge 124 has been moved to the front bridge stowage position and the head tube 138 has been moved to the head tube stowage position.

Figure 16:
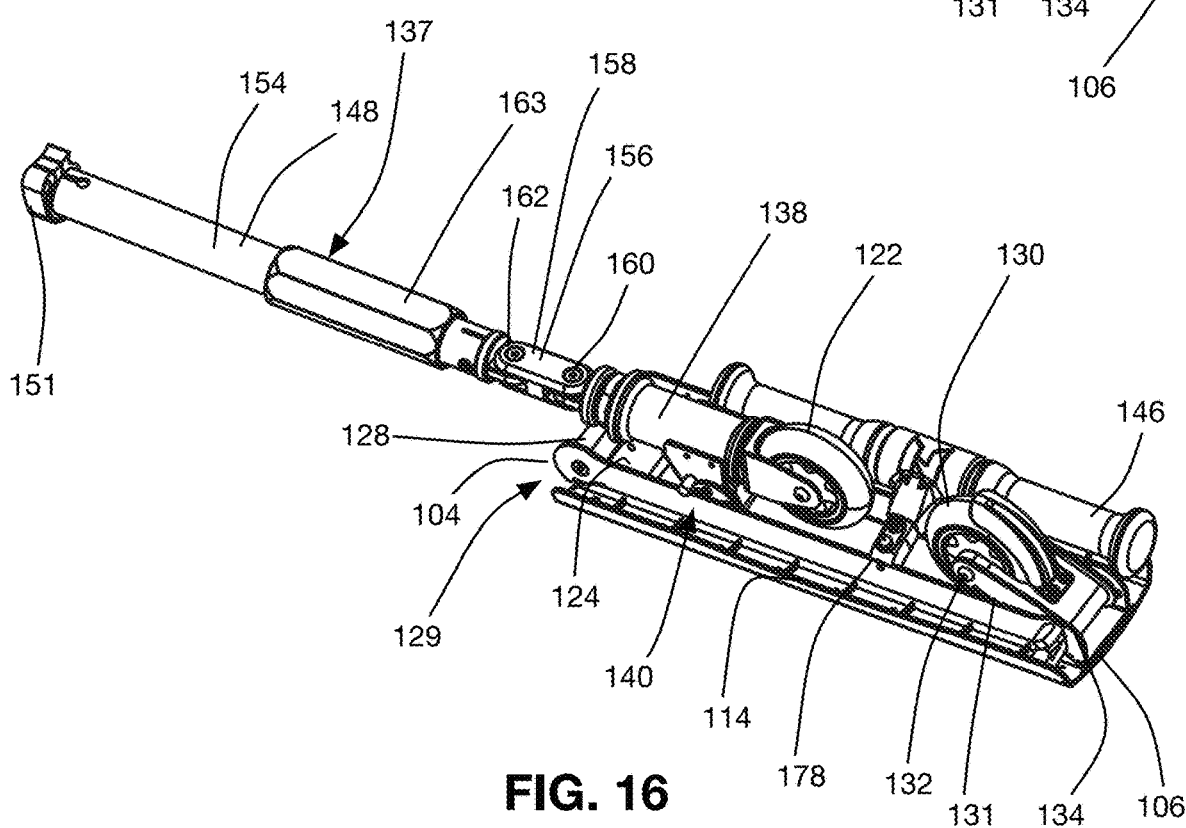

FIG. 16 shows that the hinge sleeve 163 has been unscrewed and moved to the unlocking position, exposing the steering member hinge 156. FIGS. 17 and 18 show movement of the second hinged portion 154 towards being folded fully. FIG. 19 shows the second hinged portion 154 fully folded. As noted above, in FIG. 19, the collapsible scooter 100 is in the stowage mode.

Conversely, a process to expand the collapsible scooter 100 from the stowage mode to the use mode is illustrated by a progression backwards from FIG. 19 to FIG. 11. Thus, FIGS. 18 and 17 illustrate movement of the second hinged portion 154 towards the hinged portion use position shown in FIG. 16. FIG. 15 illustrates movement of the hinge sleeve 163 from the unlocking position to the locking position where it is screwed down to generate tension in the hinge link 158. FIG. 14 shows that the front bridge 124 has been moved to the front bridge use position and the head tube 138 has been moved to the head tube use position. FIG. 13 shows that the rear bridge 131 has been moved from the rear bridge stowage position to the rear bridge use position. FIG. 12 shows that the second telescopic portion 150 has been extended. FIG. 11 shows that the handle 146 has been installed in the receiving aperture 179 of the second telescopic portion 150. As noted above, the collapsible scooter 100 is in the use mode in FIG. 11.

In the embodiment shown, the collapsible scooter 100 has a partial-stowage mode. In the partial stowage mode, the front bridge 124 may be in the front bridge stowage position, and the head tube 138 may be in the head tube stowage position. However, the steering member 137 may remain unfolded (i.e. the second hinged portion may remain in the hinged portion use position), and may thus extend forward of the front end 104 of the footboard 102 as shown in FIG. 15. Optionally, the handle 146 may remain held in the second steering member end 144 of the steering member 137. Optionally, if the steering member 137 includes the first and second telescopic portions 148 and 150, the second telescopic portion 150 may be retracted, or may remain extended. The partial stowage mode for the collapsible scooter 100 permits the user to quickly partially collapse the collapsible scooter 100 where time does not permit fully collapsing it, such as, for example if they are in a rush to catch a subway, a bus or other public transportation. In embodiments where the collapsible scooter 100 includes the handle 8 instead of the handle 146, the handle 8 may be in the handle use position or in the handle stowage position when the collapsible scooter 100 is in the partial-stowage position. In some embodiments, the front bridge 124 may be in the front bridge use position and the head tube 138 may be put in the head tube stowage position, when the collapsible scooter 100 is in the partial-stowage mode. As a result, the steering member 137 would extend rearwardly, and adjacent to the top surface 108 of the footboard 102, instead of extending forwardly away from the footboard 102 as shown in FIG. 15. In embodiments in which a rear bridge 131 is provided and is movable, the rear bridge 131 may be in the rear bridge stowage position, or in the rear bridge use position when the collapsible scooter 100 is in the partial-stowage mode.

While the collapsible scooter 100 is shown as including the steering member hinge 156, it is alternatively possible for the collapsible scooter 100 to include the hinge 5 shown in FIGS. 1-10. Any suitable means for locking the hinge 5 for the second hinged portion 154 to be held in the hinged portion use position could be used, such as the locking mechanism 5a described above.

While the above described embodiments of the collapsible scooter 1 and 100 are kick scooters (i.e. manually propelled), it is alternatively possible for the collapsible scooter 1 and/or 100 to be a motorized scooter. This can be achieved, for example, by providing a battery pack in a compartment in the footboard 2, 102, and by providing an electric motor as a hub motor in the rear wheel 9b, 130 that is connected via a suitable electrical conduit to the battery pack through the rear bridge 131. A suitable control interface may be provided on the handle 8, 146 to permit the user to control the operation of the electric motor.

Although specific advantages have been enumerated above, various embodiments may include some, none, or all of the enumerated advantages.

Persons skilled in the art will appreciate that there are yet more alternative implementations and modifications possible, and that the above examples are only illustrations of one or more implementations. The scope, therefore, is only to be limited by the claims appended hereto and any amendments made thereto.

What is claimed is:

1. A collapsible scooter, comprising:
    a footboard having a front end, a rear end, a top surface, and a bottom region, wherein the footboard defines a longitudinal axis for the collapsible scooter;
    a front bridge having a first front bridge end and a second front bridge end, wherein the front bridge is hingedly connected at the second front bridge end to the footboard for movement between a front bridge use position in which the first front bridge end is positioned forward of the front end of the footboard, and a front bridge stowage position in which the first front bridge end is positioned rearward of the front end of the footboard;

a head tube defining a steering axis, wherein the head tube is hingedly connected to the front bridge for movement between a head tube use position and a head tube stowage position, wherein, when the front bridge is in the front bridge use position and the head tube is in the head tube use position, the head tube is positioned forward of the footboard and is oriented such that the steering axis is approximately perpendicular to the top surface of the footboard, and wherein in the head tube stowage position, the head tube is positioned rearward of the front end of the footboard;

a steering member that passes through the head tube and is pivotable therein about the steering axis, wherein the steering member has a first steering member end and a second steering member end, wherein the first steering member end has a first wheel rotatably connected thereto, and the second steering member end has a handle for gripping by a user; and a second wheel rotatably coupled to the footboard, wherein, in a use mode for the collapsible scooter, the front bridge is positioned in the front bridge use position and the head tube is positioned in the head tube use position, and the first and second wheels are positioned to support the footboard above a ground surface;

wherein, in a stowage mode for the collapsible scooter, the front bridge is positioned in the front bridge stowage position and the head tube is positioned in the head tube stowage position;

wherein the collapsible scooter further includes a rear bridge having a first rear bridge end and a second rear bridge end, wherein the rear bridge is hingedly connected at the second rear bridge end to the footboard for movement between a rear bridge use position in which the first rear bridge end is positioned rearward of the rear end of the footboard, and a rear bridge stowage position in which the first end is positioned forward of the rear end of the footboard, wherein the second wheel is rotatably connected to the rear bridge;

wherein, when the front bridge is in the front bridge stowage position and the rear bridge is in the rear bridge stowage position and the head tube is in the head tube stowage position, the front bridge, the rear bridge and the head tube are all positioned underneath the bottom region of the footboard; and wherein the bottom region of the footboard includes at least one longitudinally-extending channel, and when the collapsible scooter is in the stowage mode, the front bridge, being in the front bridge stowage position, the rear bridge, being in the rear bridge stowage position, are all positioned at least partially in the at least one channel.

2. The collapsible scooter as claimed in claim 1, wherein, in the front bridge stowage position the front bridge is positioned adjacent the bottom region of the footboard and, in the head tube stowage position, the head tube is positioned such that the front bridge is positioned in between the footboard and the head tube.

3. The collapsible scooter as claimed in claim 1, wherein the steering member includes a first telescopic portion and a second telescopic portion that is telescopically connected to the first portion.

4. The collapsible scooter as claimed in claim 1, wherein the steering member includes a first hinged portion and a second hinged portion, wherein the first hinged portion passes through the head tube, and the second hinged portion is hingedly connected to the first hinged portion by a steering member hinge for movement between a hinged portion use position in which the second hinged portion is aligned with the first hinged portion along the steering axis and a hinged portion stowage position in which the second hinged portion is folded to be adjacent to the first hinged portion.

5. The collapsible scooter as claimed in claim 4, wherein second hinged portion includes a first telescopic portion and a second telescopic portion that is telescopically connected to the first portion.

6. The collapsible scooter as claimed in claim 1, wherein the bottom region of the footboard includes at least one longitudinally-extending channel, and when the collapsible scooter is in the stowage mode, the front bridge, being in the front bridge stowage position, the rear bridge, being in the rear bridge stowage position, and the head tube, being in the head tube stowage position, are all positioned at least partially in the at least one channel.

7. The collapsible scooter as claimed in claim 1, wherein the handle is coupled to the locking hinge by a locking hinge pivot, the handle configured to rotate about the locking hinge pivot, wherein the locking hinge pivot is laterally slidable within the handle slot.

8. The collapsible scooter of claim 7, wherein the locking hinge comprises a bit member configured to be received in a handle slot for securing the handle in a position generally perpendicular to the telescoping shaft.

9. The collapsible scooter of claim 8, wherein the bit member is configured to be biased by a biasing member to extend through the handle slot when the bit member is received within the handle slot to restrict rotation of the handle about the locking hinge pivot.

10. The collapsible scooter of claim 4, wherein the collapsible scooter has a partial-stowage mode in which the head tube is in the head tube stowage position, and the second hinged portion of the steering member is in the hinged portion use position.

11. The collapsible scooter of claim 10, wherein, in the partial-stowage mode, the front bridge is in the front bridge stowage position.

12. The collapsible scooter of claim 1, wherein the front bridge is pivotable in a first rotational sense about the second front bridge end during movement from the front bridge use position to the front bridge stowage position, such that the first front bridge end is rearward of the second front bridge end in the front bridge stowage position, and wherein the head tube is pivotable in a second rotational sense that is opposite to the first rotational sense about the first front bridge end during movement from the head tube use position to the head tube stowage position, such that the head tube, and the front bridge form a z-shape with the footboard when in the head tube stowage position and the front bridge stowage position respectively.

* * * * *